(12) United States Patent
Naka et al.

(10) Patent No.: US 7,817,610 B2
(45) Date of Patent: Oct. 19, 2010

(54) COMMUNICATION SYSTEM, AND COMMUNICATION DEVICE

(75) Inventors: Katsuyoshi Naka, Kanagawa (JP); Masahiko Nanri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 708 days.

(21) Appl. No.: 11/719,485

(22) PCT Filed: Oct. 27, 2005

(86) PCT No.: PCT/JP2005/019810
§ 371 (c)(1),
(2), (4) Date: May 16, 2007

(87) PCT Pub. No.: WO2006/054436
PCT Pub. Date: May 26, 2006

(65) Prior Publication Data
US 2009/0147734 A1    Jun. 11, 2009

(30) Foreign Application Priority Data
Nov. 17, 2004    (JP) .............................. 2004-333639

(51) Int. Cl.
*H04W 4/00* (2009.01)
*H04L 5/22* (2006.01)
*H04L 12/28* (2006.01)
*H04J 3/16* (2006.01)

(52) U.S. Cl. ...................... 370/338; 370/333; 370/229; 370/389; 370/465

(58) Field of Classification Search .................. 370/338
See application file for complete search history.

(56) References Cited

U.S. PATENT DOCUMENTS

| | | | |
|---|---|---|---|
| 6,804,311 B1 * | 10/2004 | Dabak et al. ................ | 375/347 |
| 2005/0053038 A1 * | 3/2005 | Kimura ....................... | 370/333 |
| 2005/0213505 A1 | 9/2005 | Iochi et al. | |
| 2005/0270975 A1 * | 12/2005 | Meylan et al. .............. | 370/229 |
| 2006/0215603 A1 | 9/2006 | Nishio et al. | |

FOREIGN PATENT DOCUMENTS

JP    2003-324442    11/2003

OTHER PUBLICATIONS

PCT International Search Report dated Nov. 29, 2005.
IEEE P802.11e/D8.0, Draft Amendment to Standard [for] Information Technology—Telecommunications and Information Exchange Between Systems—LAN/MAN Specific Requirements, Feb. 2004, pp. i-vii and 1-173.
Japanese Office Action dates Apr. 13, 2010

* cited by examiner

*Primary Examiner*—Lester Kincaid
*Assistant Examiner*—Yu (Andy) Gu
(74) *Attorney, Agent, or Firm*—Dickinson Wright PLLC

(57) ABSTRACT

A communication system which can control a data transmission properly and to which a Delayed Block ACK mode is applied, and a communication device constituting the communication system. A radio LAN base station (100) as the communication device comprises a transmission control unit (115) for transmitting a block ACK request, a pilot generation unit (104) for generating a pilot signal to measure a reception quality, and the transmission control unit (115) for transmitting the pilot signal before the block ACK having the reception quality information of the pilot signal added thereto is returned from a reception side in response to the block ACK request. A station (200) as the communication device comprises a transmission control unit (207) for controlling the transmission timing of the block ACK answering the block ACK request, a reception quality information generation unit (211) for generating the reception quality information of the pilot signal, and a block ACK generation unit (208) for adding the reception quality information to the block ACK.

7 Claims, 12 Drawing Sheets

LINEAR INTERPOLATION AND OTHER PROCESSING IS PERFORMED, AND RECEPTION QUALITY INFORMATION IS GENERATED ON THE BASIS OF THE RECEPTION QUALITY MEASUREMENT RESULTS

COMMUNICATION SYSTEM, AND COMMUNICATION DEVICE

TECHNICAL FIELD

The present invention relates to a communication system and a communication apparatus, and particularly relates to a communication system to which a delayed block ACK (Acknowledgement) scheme is applied, and to a communication apparatus that constitutes this communication system.

BACKGROUND ART

As a method of enhancing throughput in wireless LAN system, a block ACK scheme is proposed in IEEE802.11e as a technique for integrating a plurality of ACKs into a single frame and enhancing channel efficiency (non-patent document 1). An ACK is a signal returned to a transmission station when a receiving station checks for errors in received data and finds no errors.

Two schemes referred to as "immediate block ACK" and "delayed block ACK" are proposed in relation to the block ACK scheme. In the immediate Block ACK scheme as shown in FIG. 1, when obtaining transmission opportunity (TXOP), the transmission station transmits a plurality of units of QoS data in sequence, and transmits a block ACK Request for requesting transmission of a block ACK to the receiving station as the final sequential transmission. When receiving the block ACK request, the receiving station immediately integrates ACKs for the received plurality of units of data (Data #1 through Data #5 in FIG. 1) into a single frame referred to as the block ACK, and transmits the frame to the transmission station. A plurality of ACKs can thereby be transmitted in a single block ACK frame, and it is possible to reduce the header or the waiting time for media access.

In the delayed block ACK scheme as shown in FIG. 2, when obtaining transmission opportunity, the transmission station transmits a plurality of units of QoS data in sequence, and transmits a block ACK Request for requesting transmission of a block ACK to the receiving station as the final sequential transmission. Then, when receiving the block ACK request, the receiving station returns a normal ACK frame for the block ACK Request to the transmission station without immediately returning a block ACK. When the receiving station obtains transmission opportunity next time shortly thereafter, the receiving station transmits a block ACK frame. The transmission station returns an ACK to the receiving station when receiving this block ACK frame. The delayed block ACK scheme thus temporarily opens the media when the priority of data transmission is not particularly high, or in such conditions as when the media is extremely congested. The delayed block ACK scheme is therefore flexible in comparison to the immediate block ACK scheme. Non-patent Document 1: "Draft Amendment to STANDARD Information Technology-Telecommunications and Information Exchange Between Systems-LAN/MAN Specific Requirements-Part 11: Radio Medium Access Control (MAC) and Physical Layer (PHY) Specifications: Medium Access Control (MAC) Quality of Service (QoS) Enhancements," IEEE P802.11e/D8.0, February 2004.

DISCLOSURE OF INVENTION

Problems to Be Solved by the Invention

However, when transmission is performed using adaptive modulation of transmitted data, adaptive bit loading (MCS (Modulation and Coding Scheme) allocation for each subcarrier), and other techniques in a conventional communication system, reception quality information in the receiving station needs to be fed back to the transmission station, but this requirement is not addressed. The data transmission control (adaptive modulation and adaptive bit loading, for example) therefore cannot be considered appropriate.

It is possible in the conventional communication system to use the block ACK frame as a medium for transmitting the abovementioned feedback information to the transmission station. However, in a communication system to which the delayed block ACK scheme is applied, there is a long time interval between transmission of the transmission data and returning of the block ACK frame, and the accuracy (freshness) of the reception quality information therefore decreases even when reception quality information is fed back that relates to the data transmitted from the transmission station, and the information cannot be considered useful for data transmission at the transmission station. Appropriate data transmission control (adaptive modulation and adaptive bit loading, for example) therefore cannot be performed merely by providing feedback information relating to the reception quality at the reception station.

It is therefore an object of the present invention to provide a communication system to which a delayed block ACK scheme is applied that is capable of performing appropriate data transmission control, and to provide a communication apparatus that constitutes this communication system.

Means for Solving the Problem

The communication system of the present invention is a communication system that adopts a delayed block ACK scheme and a configuration having: a wireless LAN base station equipped with a pilot transmission section that transmits a pilot signal before a block ACK is returned from a reception side in response to a block ACK Request; and a station equipped with a transmission control section that controls a transmission timing of the block ACK, a reception quality measurement section that measures reception quality from the pilot signal, a reception quality information generation section that forms reception quality information on the basis of the reception quality, and a block ACK generation section that adds the reception quality information to the block ACK.

The communication terminal of the present invention adopts configuration having: a transmission section that transmits a block ACK Request, a pilot generation section that generates a pilot signal for measuring reception quality, and a pilot transmission section that transmits the pilot signal before a block ACK having reception quality information of the pilot signal added thereto is returned from a reception side in response to the block ACK Request.

The communication apparatus of the present invention adopts a configuration having a transmission control section that controls a timing at which a block ACK is transmitted in response to a block ACK Request, a reception quality information generation section that forms reception quality information of a pilot signal, and a block ACK generation section that adds the reception quality information to the block ACK.

Advantageous Effect of the Invention

According to the present invention, it is possible to provide a communication system to which a delayed block ACK scheme is applied that is capable of performing appropriate data transmission control, and also provides a communication apparatus that constitutes this communication system.

BEST SCHEME FOR CARRYING OUT THE INVENTION

Embodiments of the present invention will be described in detail hereinafter with reference to the accompanying drawings. The same reference symbols are used for the same components throughout the embodiments, and their redundant descriptions will be omitted.

Embodiment 1

Figure 1:
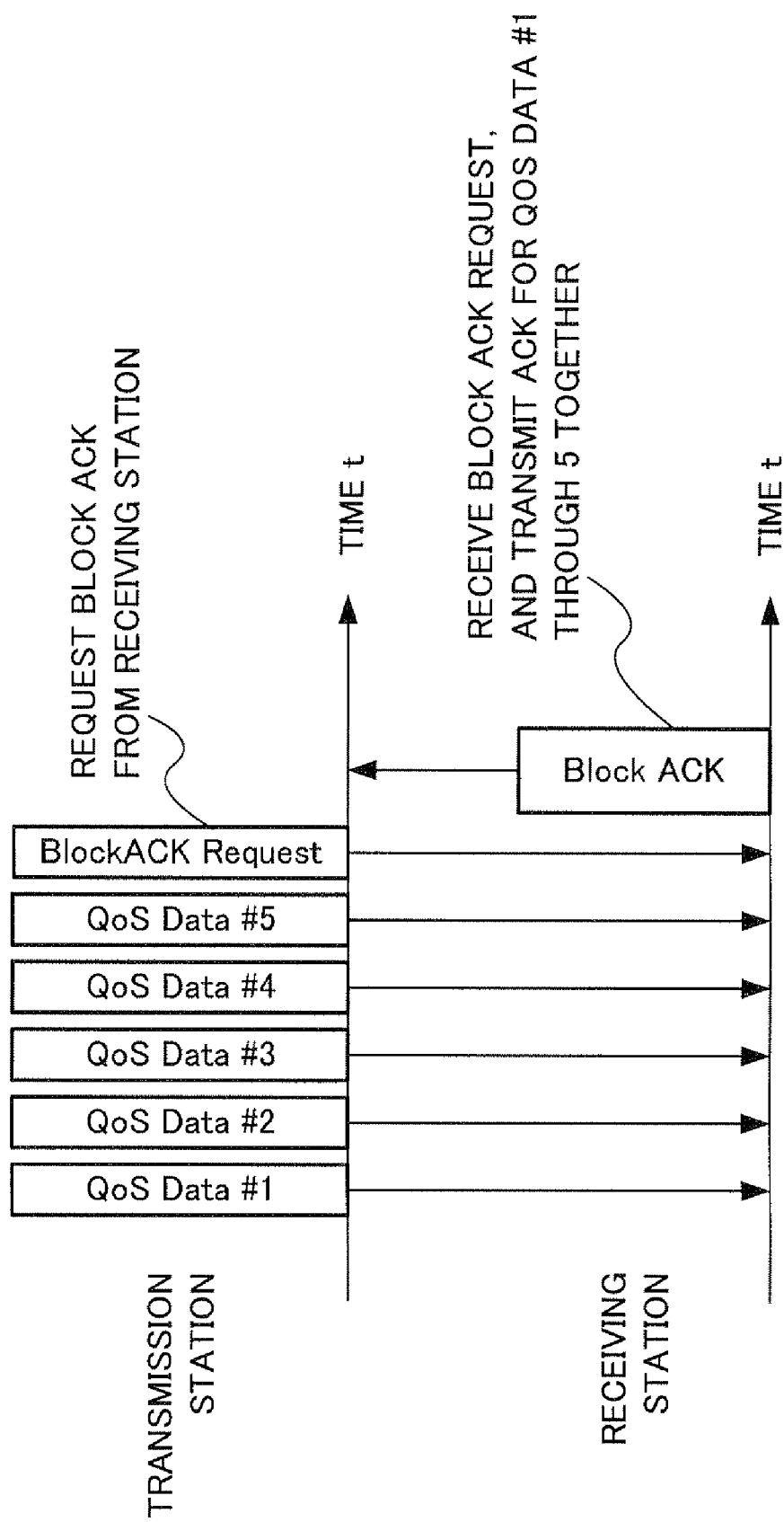
FIG. 1 is a diagram explaining the immediate block ACK scheme.
Figure 2:
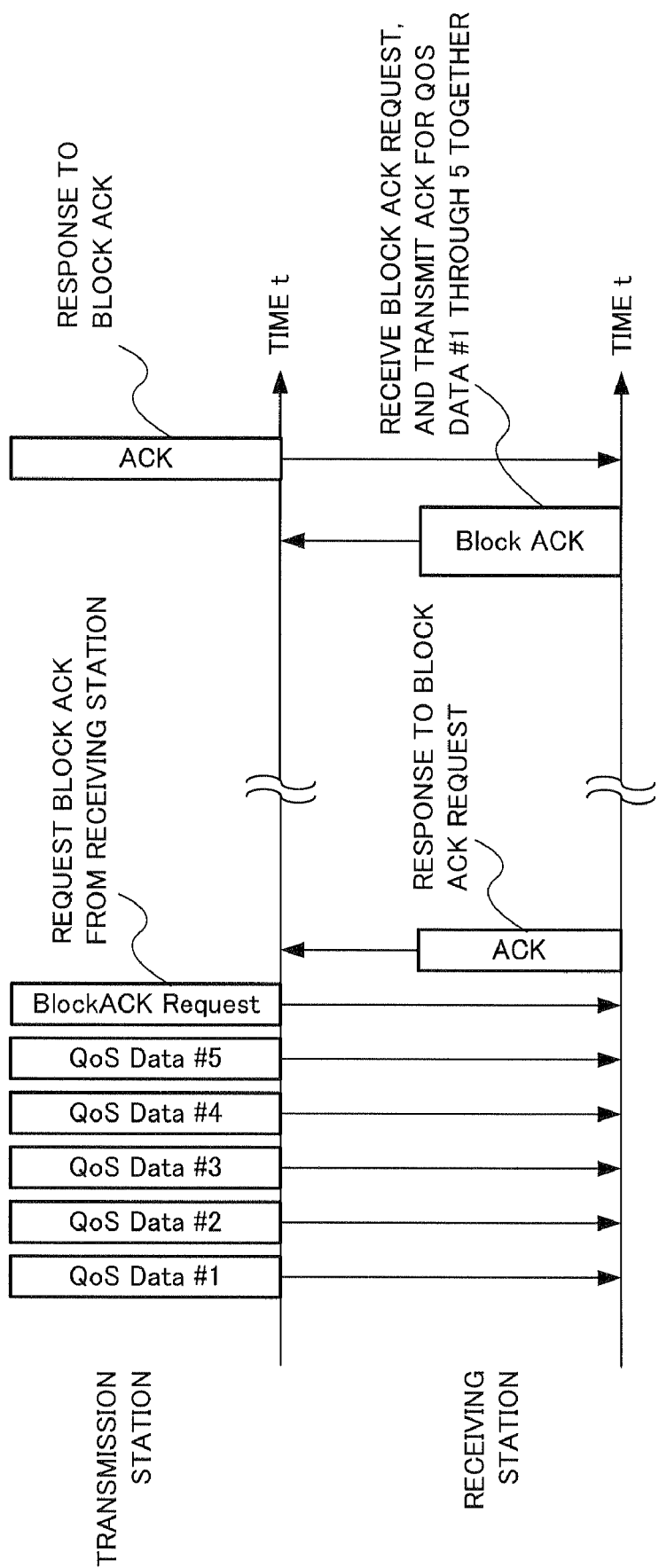
FIG. 2 is a diagram explaining the delayed block ACK scheme.
Figure 3:
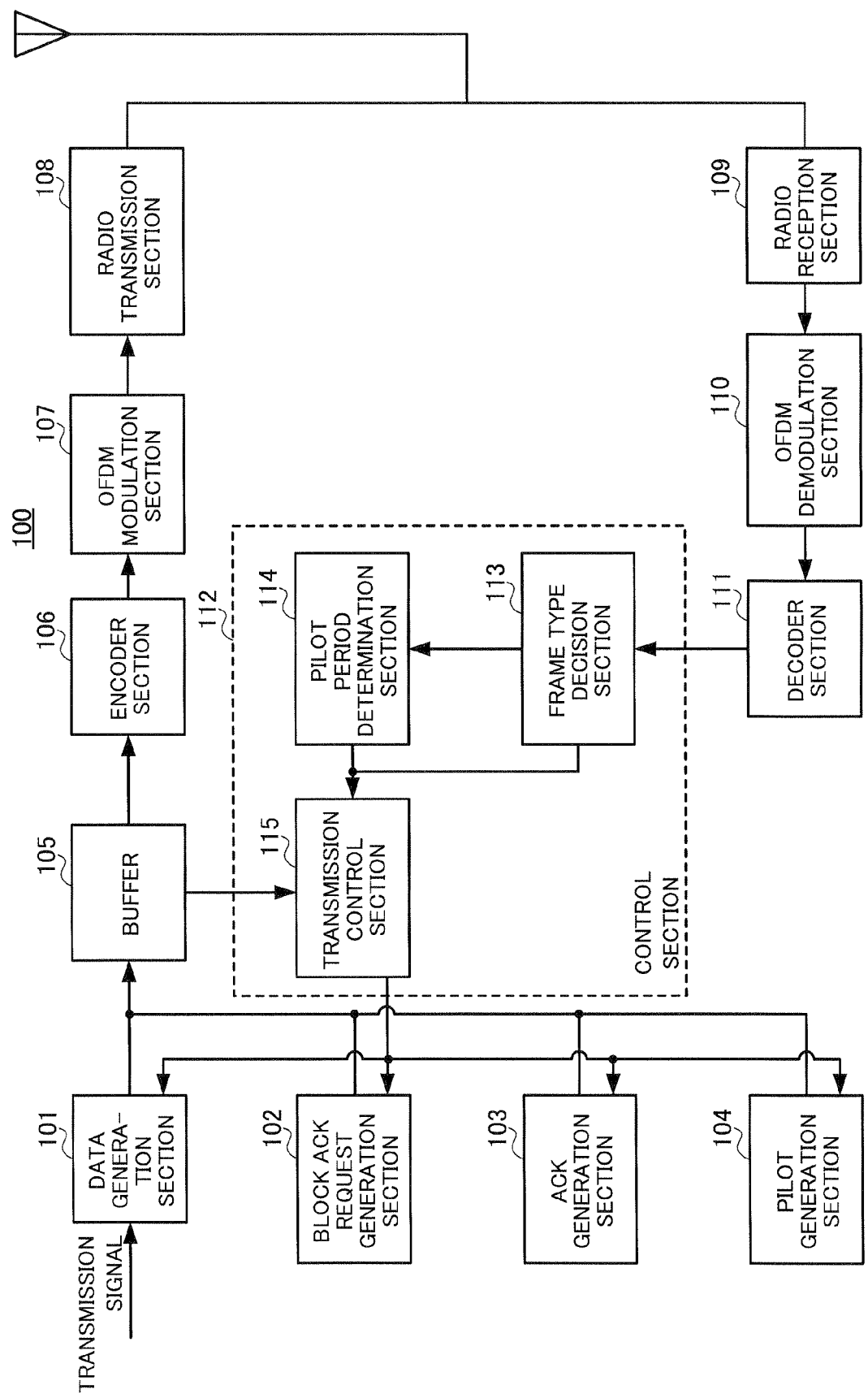
FIG. 3 is a block diagram showing the configuration of the wireless LAN base station according to Embodiment 1 of the present invention.

As shown in FIG. 3, wireless LAN base station 100 of Embodiment 1 has: data generation section 101; block ACK Request generation section 102; ACK generation section 103; pilot generation section 104; buffer 105; encoder section 106; OFDM modulation section 107; radio transmission section 108; radio reception section 109; OFDM demodulation section 110; decoder section 111; and control section 112. Control section 112 has frame type decision section 113, pilot period determination section 114, and transmission control section 115.

Data generation section 101 receives, for example, QoS transmission data as an input, and adds, for example, an appropriate header, a parity bit used for the header to check for errors, an FCS (Frame Check Sequence) for data error check use, to the transmission signal. When a "transmission command signal (includes transmission command and transmission timing)" is inputted from transmission control section 115 of control section 112, data generation section 101 outputs a frame stored in data generation section 101 to buffer 105 in accordance with the transmission timing.

After transmission of the QoS transmission data frame is completed, when a "transmission command signal" is inputted from transmission control section 115 of control section 112, block ACK Request generation section 102 generates a block ACK Request frame in which, for example, the same destination address as in the QoS transmission data, a frame type that indicates the presence of a block ACK frame, the block ACK type (immediate or delayed) are added to the header part. Block ACK request generation section 102 then outputs the block ACK request frame to buffer 105 in accordance with the transmission timing information included in the transmission command signal.

ACK generation section 103 generates a responding ACK frame when receiving the block ACK frame from the station. When receiving the "transmission command signal" as an input from transmission control section 115 of control section 112, ACK generation section 103 outputs the ACK frame to buffer 105 in accordance with the transmission timing information included in the transmission command signal.

When receiving the ACK frame from the station, pilot generation section 104 receives the "transmission command signal" as an input from transmission control section 115 of control section 112. This transmission command signal includes a transmission command and the pilot period information. When receiving the transmission command signal as an input, pilot generation section 104 generates a predetermined pilot signal, and outputs the pilot signal to buffer 105 in accordance with the pilot period information.

Buffer 105 receives transmission frames as inputs from data generation section 101, block ACK request generation section 102, ACK generation section 103, and pilot generation section 104. Each transmission frame is transmitted in accordance with a specified transmission timing, and buffer 105 outputs the inputted frames as is to encoder section 106. At the same time, buffer 105 outputs to transmission control section 115 of control section 112, a transmission completion signal indicating completion of the procedure for transmitting the transmission frames.

Figure 4:
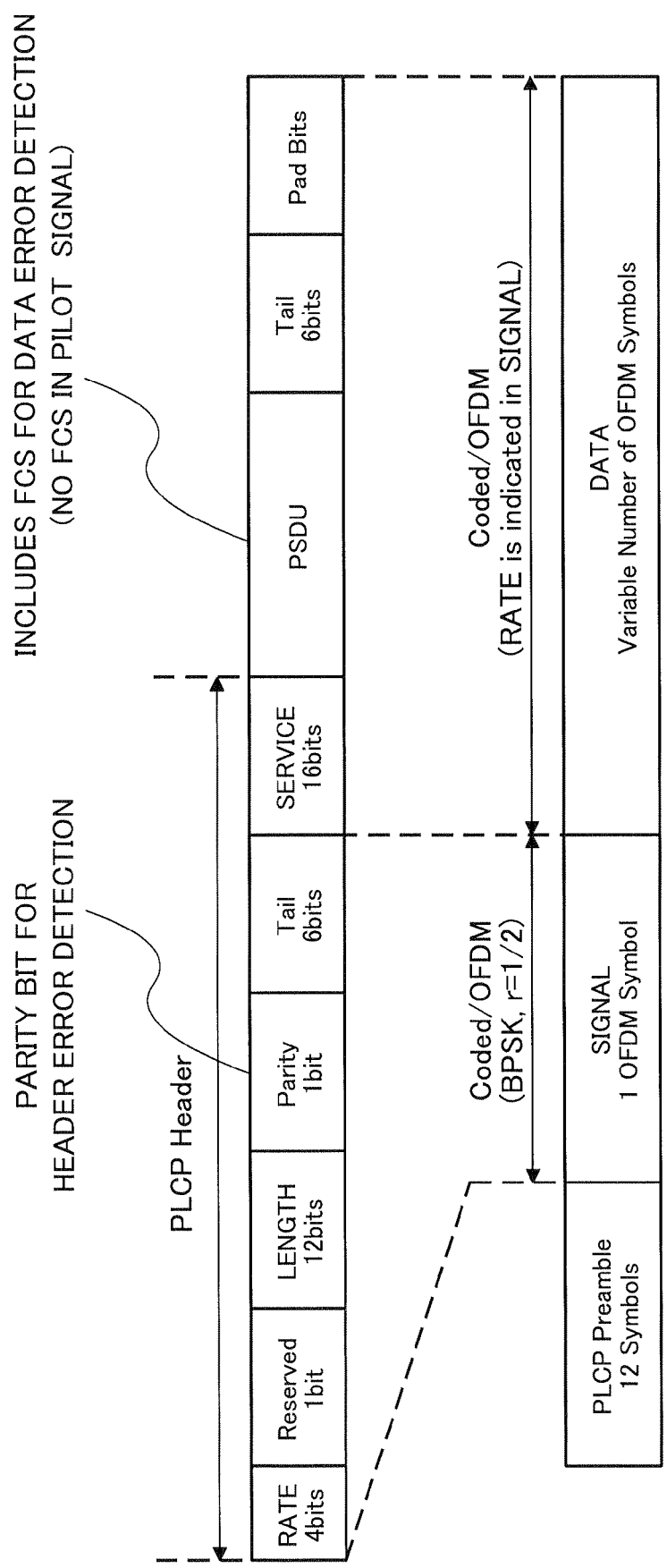
FIG. 4 is a diagram showing an example of the transmission frame configuration described in the embodiments.

Encoder section 106 receives a transmission frame from buffer 105 as an input, performs the appropriate encoding, and outputs the result to OFDM modulation section 107. This appropriate encoding is determined by the frame type, and for example, the coding rate can also vary according to the propagation channel when adaptive modulation is supported for QoS frames. FIG. 4 shows an example of the transmission frame configuration used in the embodiments.

OFDM modulation section 107 receives the encoded transmission frame as an input, performs signal processing necessary for OFDM modulation including, for example, the predetermined M-array modulation and IFFT, and outputs the OFDM modulated signal to radio transmission section 108.

Radio transmission section 108 receives the OFDM modulated signal as an input, performs RF processing (including, for example, upconversion), and transmits the transmission frame through an antenna to the station.

Radio reception section 109 receives the received signal through the antenna as an input, performs RF processing (for example, downconversion) on this received signal, and outputs this RF-processed signal to OFDM demodulation section 110.

OFDM demodulation section 110 receives the RF-processed signal as an input from radio reception section 109, performs the received signal processing necessary for OFDM signal reception including, for example, FFT and de-interleaving, to perform OFDM demodulation. The OFDM-demodulated signal is then outputted to decoder section 111.

Decoder section 111 receives the OFDM demodulated signal as an input, performs appropriate error correction decoding, and outputs the decoded signal as the received signal to frame type decision section 113.

Frame type decision section 113 receives the received signal as an input from decoder section 111, refers to the header part of this received signal, and determines the frame type of the received signal. Information is outputted to pilot period determination section 114 and transmission control section 115 according to the determination result of the frame type.

Specifically, when the frame type of the received signal is an ACK frame, frame type decision section 113 outputs the frame type information to transmission control section 115, and outputs a pilot period determination command to pilot period determination section 114. When the frame type of the received signal is a block ACK frame, frame type decision section 113 outputs the frame type information to transmission control section 115.

When receiving the pilot period determination command as an input, pilot period determination section 114 computes the appropriate pilot period and outputs the pilot transmission period information to transmission control section 115.

When the transmission completion signal inputted from buffer 105 indicates continuation of QoS data frame transmission, transmission control section 115 outputs a transmission command signal to data generation section 101. When the transmission completion signal inputted from buffer 105 indicates completion of QoS data frame transmission, a transmission command signal is outputted to block ACK request generation section 102. When the transmission completion signal inputted from buffer 105 indicates completion of block ACK request transmission, transmission control section 115 outputs a transmission command signal to pilot generation section 104 after receiving the pilot transmission period from pilot period determination section 114. When the transmission completion signal inputted from buffer 105 indicates completion of pilot signal transmission, transmission control section 115 outputs a transmission command signal to pilot generation section 104 and ACK generation section 103.

When the frame type information from frame type decision section 113 indicates that the frame is an ACK frame, and when the pilot transmission period is received from pilot period determination section 114, transmission control section 115 outputs a transmission command signal to pilot generation section 104. Transmission control section 115 outputs a transmission command signal to ACK generation section 103 when the frame type information from frame type decision section 113 indicates that the frame is a block ACK frame.

Figure 5:
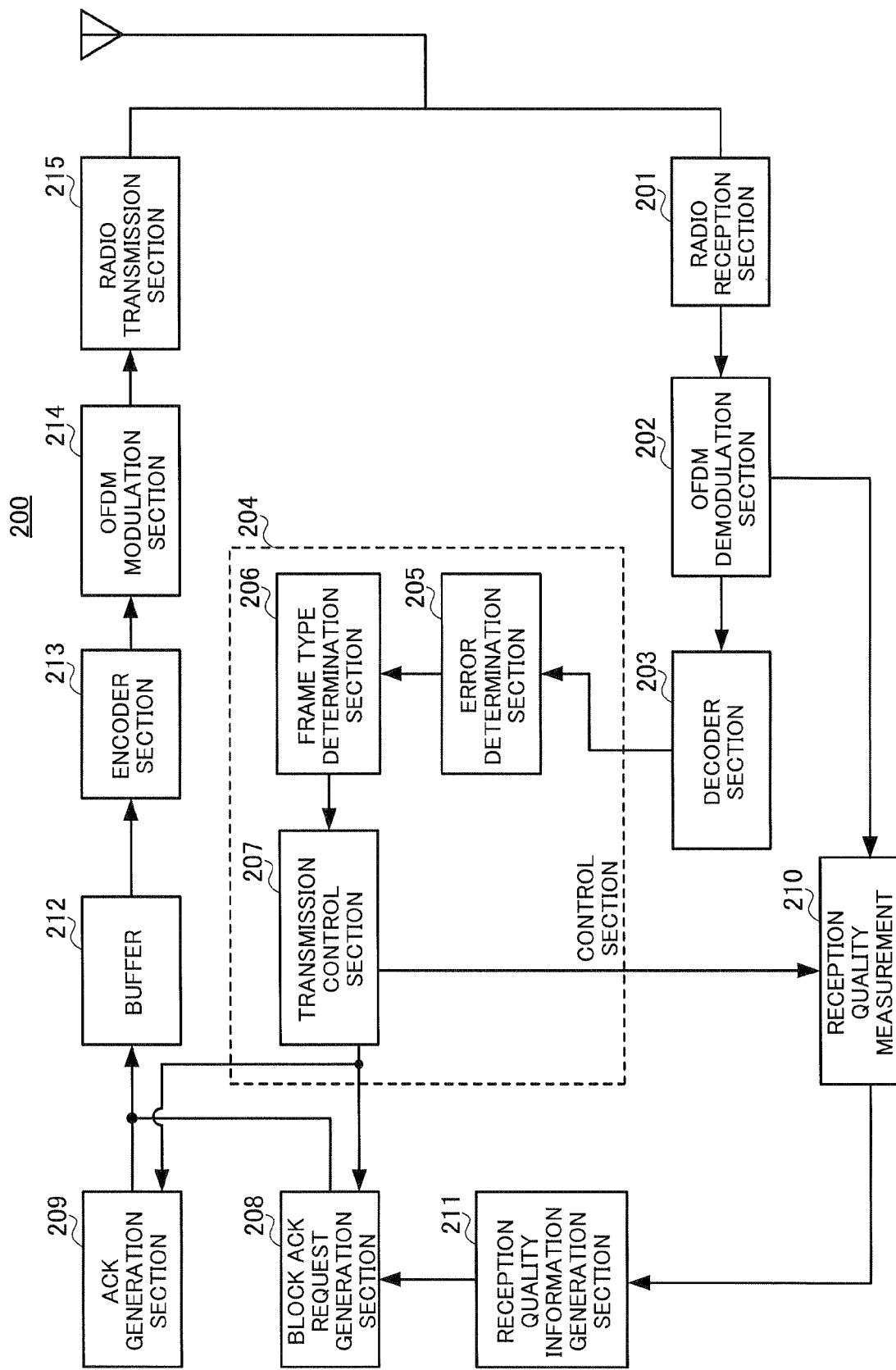
FIG. 5 is a block diagram showing the configuration of the station according to Embodiment 1.

As shown in FIG. 5, station 200 of Embodiment 1 has: radio reception section 201; OFDM demodulation section 202; decoder section 203; control section 204; block ACK generation section 208; ACK generation section 209; reception quality measurement section 210; reception quality information generation section 211; buffer 212; encoder section 213; OFDM modulation section 214; and radio transmission section 215. Control section 204 has error determination section 205, frame type determination section 206, and transmission control section 207.

Radio reception section 201 receives a received signal as an input through the antenna, performs RF processing (for example, downconversion) of the received signal, and outputs the RF-processed signal to OFDM demodulation section 202.

OFDM demodulation section 202 receives the RF-processed signal as an input, performs the received signal processing necessary for OFDM signal reception including for example, FFT and de-interleaving to perform OFDM demodulation. The OFDM-demodulated signal is then outputted to decoder section 203 and reception quality measurement section 210.

Decoder section 203 receives the OFDM-demodulated signal as an input, performs appropriate error correction decoding, and outputs the decoded signal to error determination section 205 of control section 204.

Error determination section 205 receives the decoding results of the received signal as an input from decoder section 203, and, on the basis of the decoding results, performs error detection of the header part from the parity bit of the header and error detection of the data part by FCS. Error determination section 205 then outputs the error detection results and the decoding results of the header part and the data part to frame type determination section 206.

Frame type determination section 206 receives the error detection result and decoding result of the header part and the data part as inputs, and first determines whether the check result of the header part is OK or NG. When the determination indicates that the check result of the header part is OK, frame type determination section 206 refers to the header part of the received signal from the decoding result and determines the frame type of the received signal. Furthermore, when the check result of the data part is OK, frame type determination section 206 outputs the data part check result "OK" and the determined frame type (for example, QoS data, block ACK request, pilot, and ACK) to transmission control section 207. When the frame type is QoS data, the data part of the received signal is outputted as a received signal from the decoding result.

When the check result of the data part is NG, frame type determination section 206 outputs the data part check result "NG" and the determined frame type (for example, QoS data, block ACK request, pilot, and ACK) to transmission control section 207.

When the determination indicates that the check result of the header part is NG, frame type determination section 206 cannot determine the frame type, and therefore outputs, for example, a frame type that includes the information NONE to transmission control section 207.

Transmission control section 207 receives the data part check result and frame type result as inputs from frame type determination section 206, and outputs a frame number and an ACK to block ACK generation section 208 when the frame type is QoS data and when the data part check result is OK. When the frame type is QoS data, and when the data part check result is NG, transmission control section 207 outputs a frame number and a NACK to block ACK generation section 208.

When the frame type is a block ACK request, and when the data part check result is OK, transmission control section 207 outputs an ACK transmission command to ACK generation section 209. After outputting the ACK transmission command, transmission control section 207 outputs a block ACK transmission command to reception quality measurement section 210 when the radio apparatus has acquired the right (transmission opportunity) to transmit next time—that is, when the timing for transmitting the block ACK frame has arrived.

Also, when the frame type is a pilot frame, transmission control section 207 outputs a quality measurement command to reception quality measurement section 210.

When receiving the ACK transmission command (transmission command and transmission timing) from transmission control section 207, ACK generation section 209 generates an ACK frame in accordance with the corresponding block ACK request. ACK generation section 209 then outputs the generated ACK frame to buffer 212 in accordance with the transmission timing included in the ACK transmission command.

When receiving the frame number and the ACK as inputs from transmission control section 207, and receiving the reception quality information and block ACK transmission command (transmission command and transmission timing) as an input from reception quality information generation section 211, block ACK generation section 208 generates a block ACK frame in a frame format where the frame number, the ACK/NACK, and the reception quality information can be included, and outputs the block ACK frame to buffer 212 in accordance with the transmission timing included in the block ACK transmission command.

When receiving the quality measurement command as an input from transmission control section 207, reception quality measurement section 210 refers to the memory of OFDM demodulation section 202, and measures the reception quality (including, for example, SINR) of the subcarrier used for the pilot. Reception quality measurement section 210 receives the block ACK transmission command as an input at the time when the block ACK frame is transmitted, and outputs the reception quality measurement result and the block ACK transmission command to reception quality information generation section 211.

Reception quality information generation section 211 receives the result of measuring the reception quality from reception quality measurement section 210 as inputs, computes a predetermined reception quality on the basis of that measurement result, and generates reception quality information. The predetermined reception quality is computed by, for example, a simple average, a moving average, linear interpolation. Reception quality information generation section 211 outputs the reception quality information and the block ACK transmission command to block ACK generation section 208.

Buffer 212 receives the ACK frame as an input from ACK generation section 209, receives the block ACK frame as an input from block ACK generation section 208, and outputs the ACK frame and block ACK frame to encoder section 213 at the predetermined timing of each frame.

Encoder section 213 receives the transmission frame outputted as an input from buffer 212 and performs the appropriate encoding, and outputs the encoded frame to OFDM modulation section 214. The appropriate encoding is encoding that is specified for use in an ACK frame or a block ACK frame.

OFDM modulation section 214 receives the encoded transmission signal as an input from encoder section 213, performs signal processing necessary for OFDM modulation including, for example, the predetermined M-array modulation and IFFT, and outputs the OFDM-modulated signal to radio transmission section 215.

Radio transmission section 215 receives the OFDM-modulated signal as an input, performs RF processing, and transmits the RF-processed transmission signal through the antenna.

The operations of the communication system formed from wireless LAN base station 100 and station 200 will next be described with reference to FIG. 6. The delayed block ACK scheme is applied to this communication system.

In Embodiment 1, wireless LAN base station 100 transmits a QoS data frame to station 200, and periodically transmits a pilot signal for reception quality measurement to station 200 before station 200 returns a block ACK frame for the transmitted QoS data frame. Station 200 measures the reception quality from the pilot signals, forms reception quality information on the basis of the measurement results, adds this reception quality information to the block ACK frame, and feeds the result back to wireless LAN base station 100.

Wireless LAN base station 100 applies the reception quality information added to the block ACK frame and fed back, to MCS selection for adaptive modulation, adaptive bit loading, and other techniques that require feedback information from the reception side.

Figure 6:
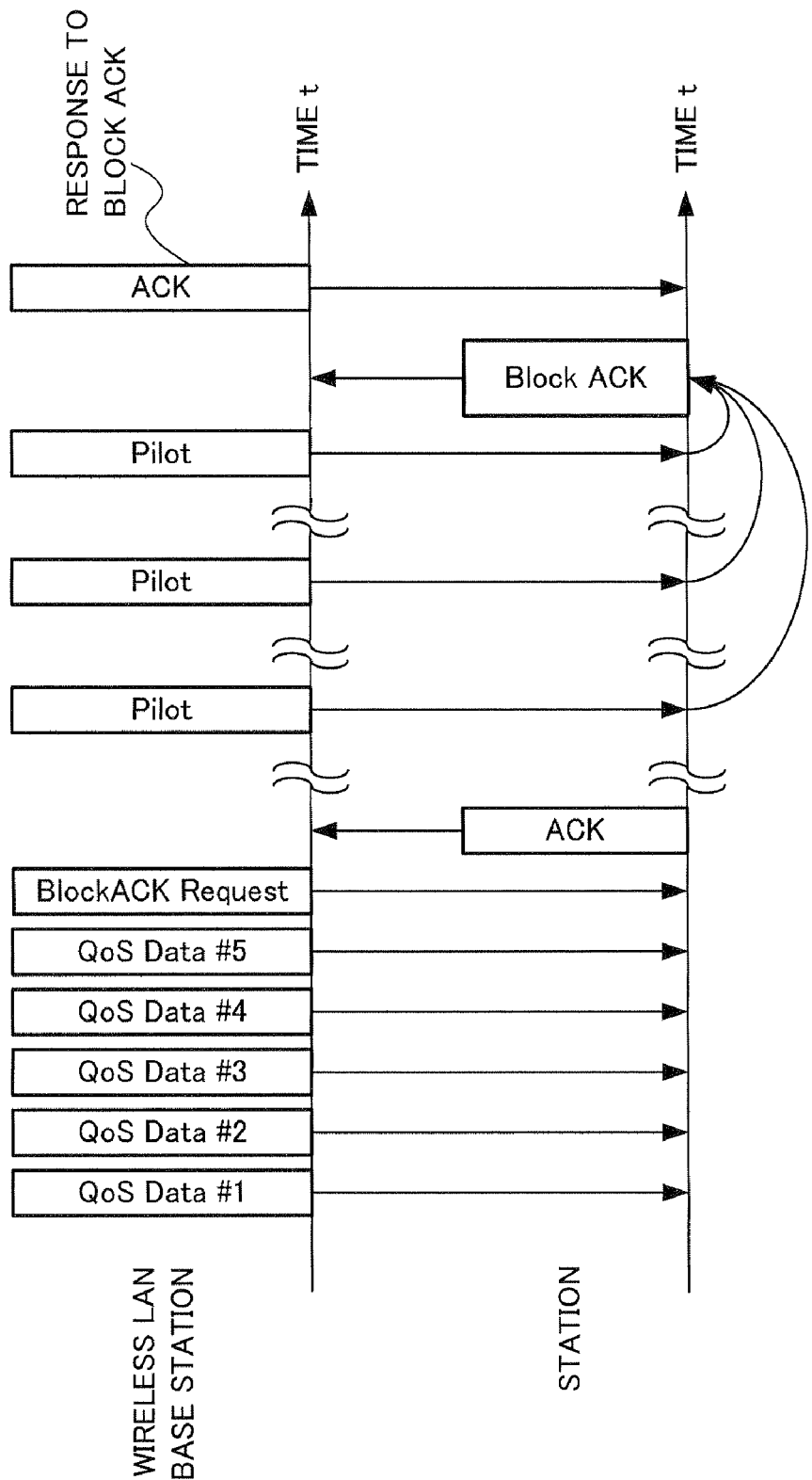
FIG. 6 is a diagram showing the operations of the communication system formed from the wireless LAN base station and station shown in FIG. 3 and FIG. 5, respectively.

Specifically, in wireless LAN base station 100 shown in FIG. 6, the transmission command signal from transmission control section 115 is inputted to data generation section 101, and a transmission frame is outputted in accordance with the transmission timing included in the transmission command signal.

The outputted transmission frame is transmitted to station 200 via buffer 105, encoder section 106, OFDM modulation section 107, and radio transmission section 108. In FIG. 6, QoS data #1 through 5 are transmitted as the transmission data.

When a QoS transmission frame is transmitted, a QoS data frame transmission completion is inputted from buffer 105 to transmission control section 115, and a transmission command signal is outputted from transmission control section 115 to block ACK request generation section 102. Block ACK request generation section 102 then generates a block ACK request frame in which the same destination address as the QoS transmission frame, a frame type that indicates the presence of a block ACK frame, and the block ACK type (immediate or delayed) are added to the header part. Block ACK request generation section 102 then outputs the block ACK request frame in accordance with the transmission timing information included in the transmission command signal.

This block ACK request frame is transmitted to station 200 via buffer 105, encoder section 106, OFDM modulation section 107, and radio transmission section 108. The block ACK request frame is also transmitted in FIG. 6 from wireless LAN base station 100 to station 200 after QoS data #5.

When receiving the block ACK request frame, station 200 inputs to control section 204 a received signal for which the predetermined processing has been performed in radio reception section 201, OFDM demodulation section 202, and decoder section 203. Error check of the header part and the data part is performed in error determination section 205, the frame type is determined in frame type determination section 206, and the data part check results and the determined frame type are inputted to transmission control section 207. Since the block ACK request frame is received here, the frame type inputted to transmission control section 207 is a block ACK request.

In transmission control section 207, when the inputted frame type is indicated as a block ACK request, and when the data part check result is OK, an ACK transmission command is outputted to ACK generation section 209. When the ACK transmission command (transmission command and transmission timing) is inputted from transmission control section 207 to ACK generation section 209, the generated ACK frame is outputted to buffer 212 in accordance with the transmission timing included in the ACK transmission command.

The outputted ACK frame is transmitted to wireless LAN base station 100 via buffer 212, encoder section 213, OFDM modulation section 214, and radio transmission section 215. Station 200 also returns the ACK frame after receiving the block ACK request from wireless LAN base station 100 in FIG. 6.

When receiving the ACK frame, wireless LAN base station 100 inputs to control section 112 a received signal for which the predetermined processing has been performed in radio reception section 109, OFDM demodulation section 110, and decoder section 111. The frame type is determined in frame type decision section 113. Since an ACK frame is received herein, frame type decision section 113 outputs the frame type information to transmission control section 115, and a pilot period determination command to pilot period determination section 114.

When receiving the pilot period determination command as an input, pilot period determination section 114 computes an appropriate pilot period and outputs the pilot transmission period to transmission control section 115. In Embodiment 1, a predetermined pilot transmission period is outputted. When the frame type information from frame type decision section 113 indicates that the frame is an ACK frame, and when the pilot transmission period is received from pilot period determination section 114, transmission control section 115 outputs a transmission command signal to pilot generation section 104.

When receiving the transmission command signal as an input, pilot generation section 104 generates a predetermined pilot signal, and outputs the pilot signal in accordance with the pilot transmission period information. The pilot signal is transmitted to station 200 in the predetermined transmission period via buffer 105, encoder section 106, OFDM modulation section 107, and radio transmission section 108. In FIG. 6, the pilot signal is also transmitted to station 200 in the predetermined signal period.

When receiving the pilot signal, station 200 inputs to control section 204 a received signal for which the predetermined processing has been performed in radio reception section 201, OFDM demodulation section 202, and decoder section 203. Error checking of the header part and the data part is performed in error determination section 205, the frame type is determined in frame type determination section 206, and the data part check results and the determined frame type are inputted to transmission control section 207. Since the pilot signal is received here, the frame type inputted to transmission control section 207 is a pilot.

In transmission control section 207, when the frame type is a pilot frame, and when the data part check result is OK, a quality measurement command is outputted to reception quality measurement section 210.

When receiving the quality measurement command as an input from transmission control section 207, reception quality measurement section 210 refers to the memory of OFDM demodulation section 202 and measures the reception quality (including, for example, SINR) of the subcarrier used for the pilot.

After outputting the ACK transmission command, transmission control section 207 outputs a block ACK transmission command to reception quality measurement section 210 when the radio apparatus has acquired the right (transmission opportunity) to transmit next time—that is, when the timing for transmitting the block ACK frame has arrived.

When receiving the block ACK transmission command as an input, reception quality measurement section 210 outputs the measurement results and the block ACK transmission command to reception quality information generation section 211.

Reception quality information generation section 211 receives the results of measuring the reception quality as an input from reception quality measurement section 210, computes the predetermined reception quality on the basis of the measurement results, and generates reception quality information. The predetermined reception quality is computed by, for example, a simple average, a moving average, linear interpolation. Reception quality information generation section 211 outputs the reception quality information and the block ACK transmission command to block ACK generation section 208.

When receiving the frame number and the ACK as inputs from transmission control section 207, and receiving the reception quality information and block ACK transmission command (transmission command and transmission timing) as an input from reception quality information generation section 211, block ACK generation section 208 generates a block ACK frame in a frame format where the frame number, the ACK/NACK, and the reception quality information can be included, and outputs the block ACK frame to buffer 212 in accordance with the transmission timing included in the block ACK transmission command. In FIG. 6, the frame number and ACK/NACK are the frame number corresponding to QoS data #1 through 5, and ACK/NACK information relating to each frame of QoS data #1 through 5, respectively. The reception quality information is computed based on the result of measuring the reception quality relating to the subcarrier used for the pilot signal transmitted from wireless LAN base station 100. The block ACK frame outputted from block ACK generation section 208 is transmitted to wireless LAN base station 100 via buffer 212, encoder section 213, OFDM modulation section 214, and radio transmission section 215. The block ACK frame is also transmitted in FIG. 6 to wireless LAN base station 100 from station 200.

When receiving the block ACK frame, wireless LAN base station 100 inputs to control section 112 a received signal for which the predetermined processing has been performed in radio reception section 109, OFDM demodulation section 110, and decoder section 111. The frame type is then determined in frame type decision section 113. Since a block ACK frame is received here, the frame type information (indicating block ACK) is outputted to transmission control section 115 from frame type decision section 113.

When the frame type information from frame type decision section 113 indicates that the frame is block ACK, transmission control section 115 outputs a transmission command signal to ACK generation section 103. ACK generation section 103 generates a responding ACK frame when receiving the block ACK from station 200, and outputs the ACK frame in accordance with the transmission timing information included in the transmission command signal. The ACK frame is transmitted to station 200 via buffer 105, encoder section 106, OFDM modulation section 107, and radio transmission section 108. The ACK frame is also transmitted in FIG. 6 from wireless LAN base station 100 to station 200 as a response to the block ACK frame.

Thus, according to Embodiment 1, wireless LAN base station 100 is provided with transmission control section 115 that transmits a block ACK request; pilot generation section 104 that generates a pilot signal for measuring reception quality; and transmission control section 115 that transmits the pilot signal before a block ACK to which the computed reception quality information has been added is returned from the reception side in response to a block ACK request.

In this way, it is possible to receive a block ACK to which the reception quality information on the reception side of the pilot signal transmitted by the communication apparatus, is added. It is therefore possible to obtain feedback information that can be used when transmission data are transmitted using, for example, adaptive modulation and adaptive bit loading (MCS allocation for each subcarrier) in wireless LAN base station 100. A wireless LAN base station can thus be provided that is capable of performing appropriate data transmission control.

Also, wireless LAN base station 100 transmits a pilot signal after receiving an ACK corresponding to the block ACK request from station 200 for which transmission control section 115 is the reception side.

By this means, when the block ACK to which the reception quality information obtained from the pilot signal is added, is returned, not much time has elapsed after measurement of the reception quality. Therefore, feedback information can be obtained that can be used when transmission data are transmitted using, for example, adaptive modulation and adaptive bit loading (MCS allocation for each subcarrier) in wireless LAN base station 100, and the feedback information is useful and accurate due to the fact that not much time has elapsed after measurement. It is possible to implement a wireless LAN base station that is capable of performing appropriate data transmission control in accordance with accurate feedback information.

Transmission control section 115 transmits a pilot signal according to a predetermined transmission period.

In this way, it is possible to implement a wireless LAN base station that is capable of performing more appropriate data transmission control and enhancing the reliability of reception quality information by performing, for example, linear interpolation of the reception quality of the plurality of periodically transmitted pilot signals on the reception side.

Further, according to Embodiment 1, station 200 is provided with transmission control section 207 that controls the timing at which the block ACK is transmitted in response to the block ACK request; reception quality information generation section 211 that forms reception quality information of the pilot signal, and block ACK generation section 208 that adds the reception quality information to the block ACK.

In this way, the reception quality information of the pilot signal is added to the block ACK, and the block ACK is transmitted, so that it is possible to provide feedback information used for, for example, adaptive modulation and adaptive bit loading (MCS allocation for each subcarrier) of the transmission data transmitted to the reception side. Thus, it is possible to implement a station that can contribute to appropriate data transmission control on the reception side of the feedback information.

Reception quality information generation section 211 then receives a plurality of pilot signals periodically transferred from wireless LAN base station 100, and forms reception quality information using the reception quality of the pilot signals.

In this way, the reception quality information of the pilot signal is added to the block ACK, and the block ACK is transmitted, so that it is possible to provide feedback information used for, for example, adaptive modulation and adaptive bit loading (MCS allocation for each subcarrier) of the transmission data to the reception side. Thus, it is possible to implement a station that is capable of contributing to appropriate data transmission control on the reception side of the feedback information, and enhancing the reliability of reception quality information by, for example, performing linear interpolation of the reception quality of the plurality of periodically transmitted pilot signals.

A case was described in Embodiment 1 in which QoS data frames were transmitted from wireless LAN base station 100 to station 200. However, in a wireless LAN system, there is no difference between the wireless LAN base station and the station, and the configurations and the operations of wireless LAN base station 100 and station 200 described above are therefore interchangeable. This applies in the same manner to the wireless LAN base station and station in each of the embodiments.

According to Embodiment 1, it is possible to implement a communication apparatus that is capable of appropriate data transmission control and a communication system that is formed from these communication apparatuses.

Embodiment 2

Figure 7:
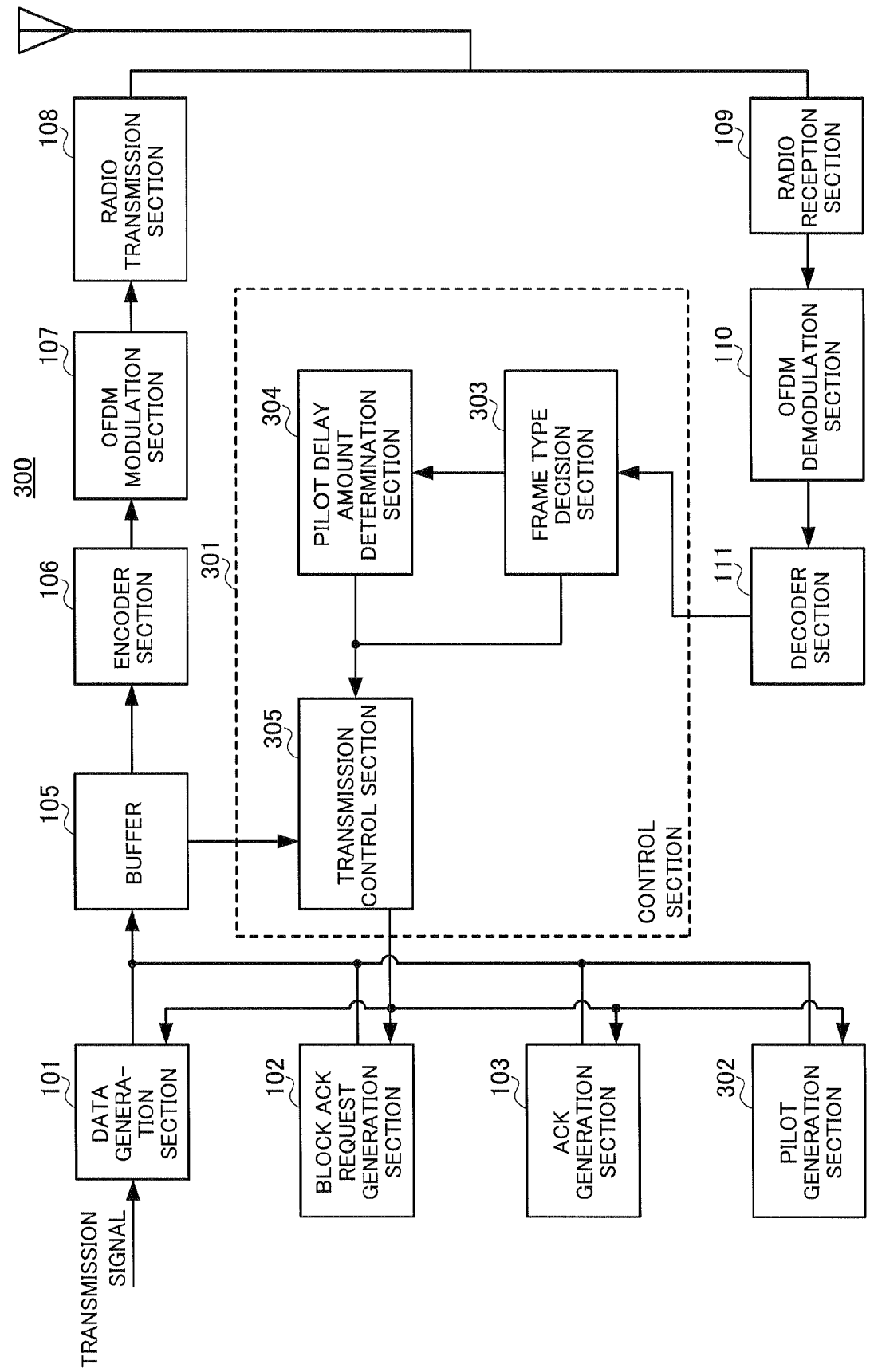
FIG. 7 is a block diagram showing the configuration of the wireless LAN base station according to Embodiment 2.

As shown in FIG. 7, wireless LAN base station 300 of Embodiment 2 has control section 301 and pilot generation section 302. Control section 301 has frame type decision section 303, pilot delay determination section 304, and transmission control section 305. Frame type decision section 303 receives the received signal as an input from decoder section 111, refers to the header part of the received signal and identifies the frame type of the received signal. Information is outputted to pilot delay determination section 304 and transmission control section 305 according to the determining result of the frame type. Specifically, when the frame type of the received signal is an ACK frame, frame type decision section 303 outputs the frame type information to transmission control section 305, and outputs a pilot delay determination command to pilot delay determination section 304. When the frame type of the received signal is a block ACK frame, frame type decision section 303 outputs the frame type information to transmission control section 305.

When the pilot delay determination command is inputted from frame type decision section 303, pilot delay determination section 304 computes the appropriate pilot signal timing and outputs the pilot transmission timing to transmission control section 305.

When the transmission completion signal inputted from buffer 105 indicates continuation of QoS data frame transmission, transmission control section 305 outputs a transmission command signal to data generation section 101. When the transmission completion signal inputted from buffer 105 indicates completion of QoS data frame transmission, a transmission command signal is outputted to block ACK request generation section 102. When the transmission completion signal inputted from buffer 105 indicates completion of block ACK request transmission, transmission control section 305 outputs a transmission command signal to pilot generation section 302 after receiving the amount of pilot delay from pilot delay determination section 304.

When the frame type information from frame type decision section 303 indicates that the frame is an ACK frame, and when pilot delay amount is received from pilot delay determination section 304, transmission control section 305 outputs a transmission command signal to pilot generation section 302. Transmission control section 305 outputs a transmission command signal to ACK generation section 103 when the frame type information from frame type decision section 303 indicates that the frame is a block ACK frame.

When receiving the ACK from the station, pilot generation section 302 receives a "transmission command signal" as an input from transmission control section 305. This transmission command signal includes a transmission command and the pilot delay amount. Pilot generation section 302 then generates the predetermined pilot signal when receiving the transmission command signal as an input, and outputs the pilot signal to buffer 105 at time intervals in accordance with the pilot delay amount.

Figure 8:
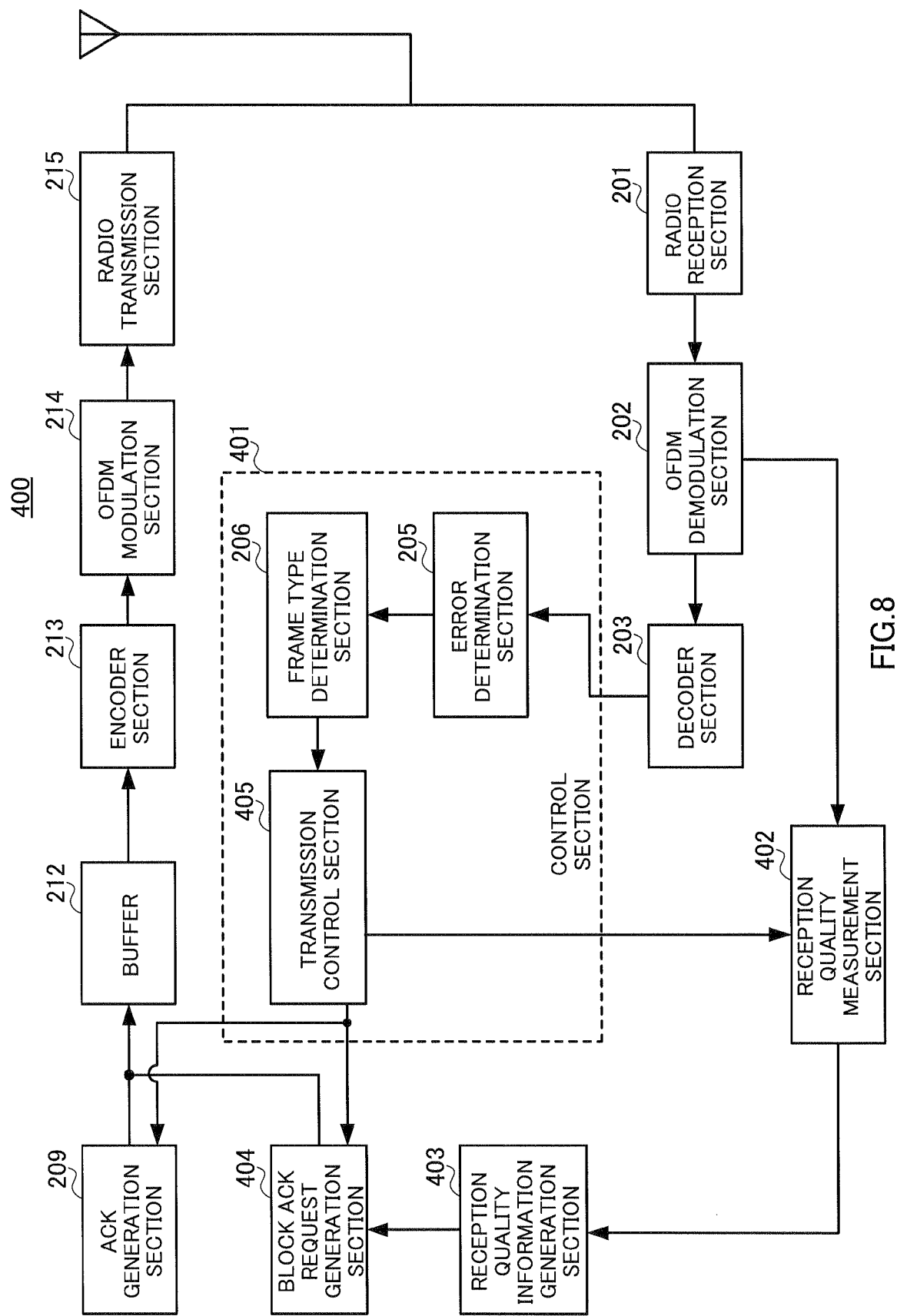
FIG. 8 is a block diagram showing the configuration of the station according to Embodiment 2.

As shown in FIG. 8, station 400 of Embodiment 2 has control section 401; reception quality measurement section 402; reception quality information generation section 403; and block ACK generation section 404. Control section 401 also has transmission control section 405.

Transmission control section 405 receives the data part check result and the frame type result as inputs from frame type determination section 206, and when the frame type is QoS data, and when the data part check result is OK, transmission control section 405 outputs a frame number and an ACK to block ACK generation section 404. When the frame type is QoS data, and when the data part check result is NG, transmission control section 405 outputs a frame number and a NACK to block ACK generation section 404.

When the frame type is a block ACK request, and when the data part check result is OK, transmission control section 405 outputs an ACK transmission command to ACK generation section 209.

When the frame type is a pilot frame, and when the CRC check result is OK, transmission control section 405 outputs a quality measurement command and a block ACK transmission command to reception quality measurement section 402.

In Embodiment 1, wireless LAN base station 100 transmits QoS data to station 200, and wireless LAN base station 100 periodically transmits a pilot signal for reception quality measurement before station 200 returns a block ACK frame in response. However, in Embodiment 2, wireless LAN base station 300 transmits QoS data to station 400, and wireless LAN base station 300 transmits only a single pilot signal for reception quality measurement immediately before station 400 returns a block ACK frame in response.

Transmission control section 207 of station 200 in Embodiment 1 outputs a quality measurement command for the time being to reception quality measurement section 210 when the pilot signal is received, and when the communication apparatus subsequently obtains the right (transmission opportunity) to transmit next, i.e., when the timing for transmitting the block ACK frame has arrived, the block ACK transmission command is outputted to reception quality measurement section 210. In contrast, when the frame type is a pilot frame, transmission control section 405 outputs both a quality measurement command and a block ACK transmission command to reception quality measurement section 402.

When reception quality measurement section 402 receives the quality measurement command inputted from transmission control section 405, reception quality measurement section 402 refers to the memory of OFDM demodulation section 202, and measures the reception quality (including, for example, SINR) of the subcarrier used for the pilot. Reception quality measurement section 402 receives the block ACK transmission command as inputs, and outputs the reception quality measurement result and the block ACK transmission command to reception quality information generation section 403.

Reception quality information generation section 403 receives the result of measuring the reception quality as an input from reception quality measurement section 402, computes predetermined reception quality on the basis of the measurement result, and generates reception quality information. However, in Embodiment 2, only a single pilot signal is transmitted from wireless LAN base station 300, and reception quality information generation section 403 therefore designates the reception quality measurement result received from reception quality measurement section 402 as the reception quality information. Reception quality information generation section 403 outputs the reception quality information and the block ACK transmission command to block ACK generation section 404. By causing wireless LAN base station 300 to transmit a single pilot signal, it is possible to prevent pilot signal traffic from increasing and to efficiently utilize the medium.

When receiving the frame number and ACK/NACK as inputs from transmission control section 405, and receiving the reception quality information and block ACK transmission command (transmission command and transmission timing) as inputs from reception quality information generation section 403, block ACK generation section 404 generates a block ACK frame in a frame format where the frame number, the ACK/NACK, and the reception quality information are included, and outputs the block ACK frame to buffer 212 in accordance with the transmission timing included in the block ACK transmission command.

Next, the operations of the communication system formed from wireless LAN base station 300 and station 400 will be described with reference to FIG. 9. The delayed block ACK scheme is applied to this communication system.

In Embodiment 2, wireless LAN base station 300 transmits a QoS data frame to station 400, and wireless LAN base station 300 transmits only a single pilot signal for reception quality measurement immediately before station 400 returns a block ACK frame in response.

Station 400 measures the reception quality from this pilot signal, forms reception quality information on the basis of the measurement results, adds this reception quality information to the block ACK frame, and feeds the result to wireless LAN base station 300.

Wireless LAN base station 300 applies the reception quality information added to the block ACK frame and fed back, to MCS selection for adaptive modulation, adaptive bit loading, and other techniques that require feedback information from the reception side.

Figure 9:
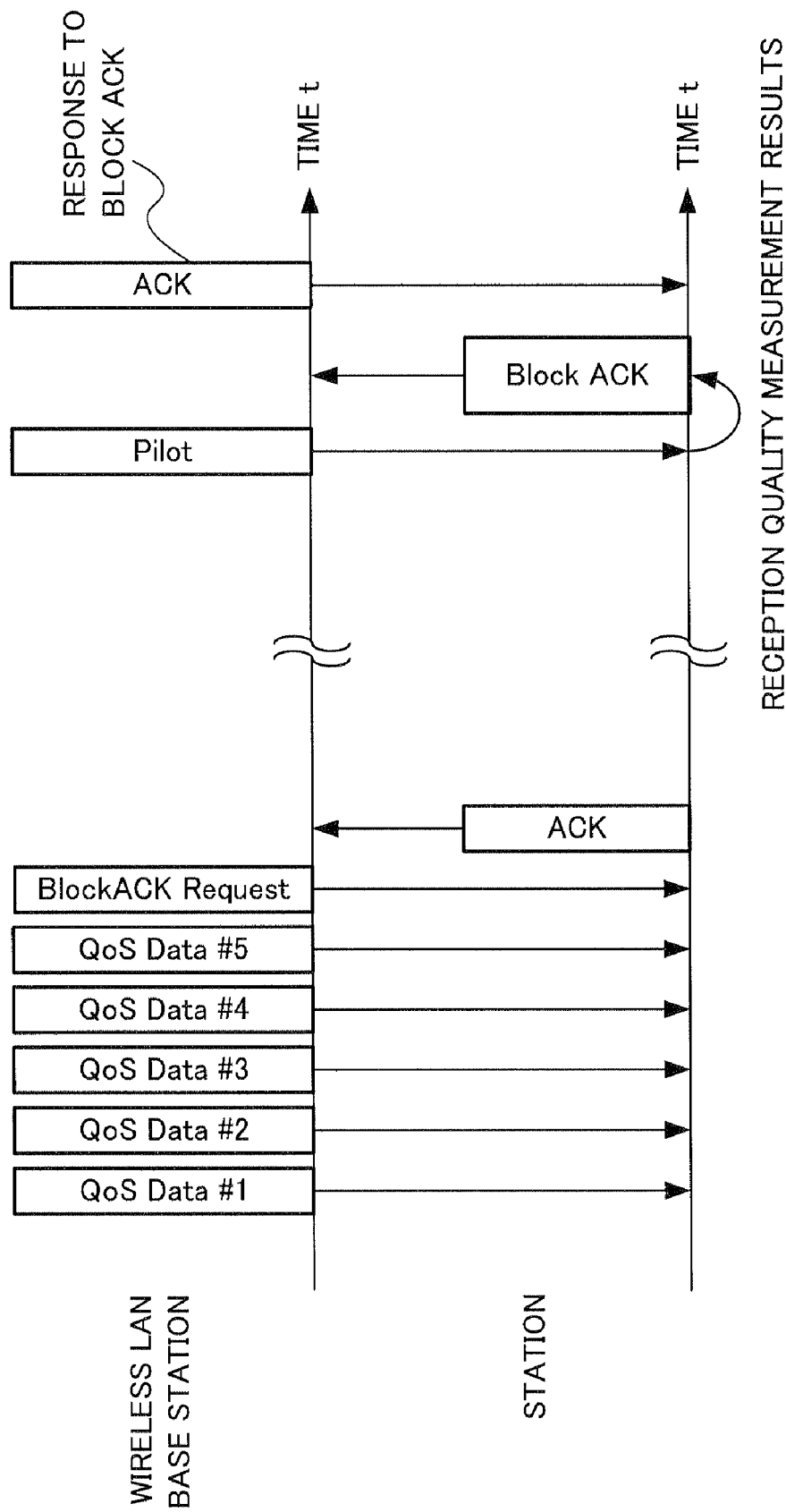
FIG. 9 is a diagram showing the operations of the communication system formed from the wireless LAN base station and station shown in FIG. 7 and FIG. 8, respectively.

Specifically, in wireless LAN base station 300 shown in FIG. 9, the transmission command signal from transmission control section 305 is inputted to data generation section 101, and a transmission frame is outputted in accordance with the transmission timing included in the transmission command signal.

The outputted transmission frame is transmitted to station 400 via buffer 105, encoder section 106, OFDM modulation section 107, and radio transmission section 108. In FIG. 9, QoS data #1 through 5 are transmitted as the transmission frames.

When a QoS transmission frame is transmitted, a QoS data frame transmission completion is inputted from buffer 105 to transmission control section 305, and a transmission command signal is outputted from transmission control section 305 to block ACK request generation section 102. Block ACK request generation section 102 then generates a block ACK request frame in which, for example, the same destination address as the QoS transmission frame, a frame type that indicates the presence of a block ACK frame, the block ACK type (immediate or delayed) are added to the header part. Block ACK request generation section 102 then outputs the block ACK request frame in accordance with the transmission timing information included in the transmission command signal.

The block ACK request frame is transmitted to station 400 via buffer 105, encoder section 106, OFDM modulation section 107, and radio transmission section 108. The block ACK request frame is also transmitted in FIG. 9 from wireless LAN base station 300 to station 400 after QoS data #5.

When receiving the block ACK request frame, station 400 inputs to control section 401 a received signal for which the predetermined processing has been performed at radio reception section 201, OFDM demodulation section 202, and decoder section 203. Error check of the header part and the data part is performed at error determination section 205, the frame type is determined in frame type determination section 206, and the data part error-check results and the determined frame type are inputted to transmission control section 405. Since the block ACK request frame is received here, the frame type inputted to transmission control section 405 is a block ACK request.

In transmission control section 405, when the inputted frame type is indicated as a block ACK request, and when the data part error-check result is OK, an ACK transmission command is outputted to ACK generation section 209. When the ACK transmission command (transmission command and transmission timing) is inputted from transmission control section 405 to ACK generation section 209, the generated ACK frame is outputted to buffer 212 in accordance with the transmission timing included in the ACK transmission command.

The outputted ACK frame is transmitted to wireless LAN base station 300 via buffer 212, encoder section 213, OFDM modulation section 214, and radio transmission section 215. Station 400 also returns the ACK frame after acquiring the block ACK request from wireless LAN base station 300 in FIG. 9.

When receiving the ACK frame, wireless LAN base station 300 inputs to control section 301 a received signal for which the predetermined processing has been performed in radio reception section 109, OFDM demodulation section 110, and decoder section 111. The frame type is determined in frame type decision section 303, and, here already receiving an ACK frame, frame type decision section 303 outputs the frame type information to transmission control section 305, and a pilot delay amount determination command to pilot delay determination section 304.

When receiving the pilot delay amount determination command as an input from frame type decision section 303, pilot delay amount determination section 304 computes an appropriate pilot transmission timing, and outputs the pilot transmission timing to transmission control section 305. When the frame type information from frame type decision section 303 indicates that the frame is an ACK frame, and the pilot transmission delay amount is received from pilot delay amount determination section 304, transmission control section 305 outputs a transmission command signal to pilot generation section 302.

When receiving the transmission command signal as an input, pilot generation section 302 generates a predetermined pilot signal and outputs the pilot signal to buffer 105 at time intervals in accordance with the pilot delay amount. This pilot signal is transmitted to station 400 in the predetermined transmission period via buffer 105, encoder section 106, OFDM modulation section 107, and radio transmission section 108. The pilot signal is also transmitted in FIG. 9 in the predetermined period to station 400.

When receiving the pilot signal, station 400 inputs to control section 401 a received signal for which the predetermined processing has been performed in radio reception section 201, OFDM demodulation section 202, and decoder section 203. Error check of the header part and the data part is performed in error determination section 205, the frame type is determined in frame type determination section 206, and the data part error check results and the determined frame type are inputted to transmission control section 405. Since the pilot signal is received here, the frame type inputted to transmission control section 405 is a pilot.

When the frame type is a pilot frame, transmission control section 405 outputs a quality measurement command and a block ACK transmission command to reception quality measurement section 402.

When receiving the quality measurement command from transmission control section 405, reception quality measurement section 402 refers to the memory of OFDM demodulation section 202 and measures the reception quality (including, for example, SINR) of the subcarrier used for the pilot. Reception quality measurement section 402 also receives the block ACK frame transmission command as an input, and outputs the measurement result and the block ACK transmission command to reception quality information generation section 403.

Reception quality information generation section 403 receives the results of measuring the reception quality as an input from reception quality measurement section 402, computes the predetermined reception quality on the basis of the measurement results, and generates reception quality information. Reception quality information generation section 403 outputs the reception quality information and the block ACK transmission command to block ACK generation section 404.

When the frame number and ACK/NACK are inputted from transmission control section 405, and the reception quality information and block ACK transmission command (transmission command and transmission timing) are inputted from reception quality information generation section 403, block ACK generation section 404 generates a block ACK frame in a frame format where the frame number, the ACK/NACK, and the reception quality information are included, and outputs the block ACK frame in accordance with the transmission timing included in the block ACK transmission command. In FIG. 9, the frame number and ACK/NACK are the frame number corresponding to QoS data #1 through 5, and ACK/NACK information relating to each frame of QoS data #1 through 5, respectively. The reception quality information is computed based on the result of measuring the reception quality relating to the subcarrier for the pilot signal transmitted from wireless LAN base station 300.

The block ACK frame outputted from block ACK generation section 404 is transmitted to wireless LAN base station 300 via buffer 212, encoder section 213, OFDM modulation section 214, and radio transmission section 215. The block ACK frame is also transmitted in FIG. 9 to wireless LAN base station 300 from station 400.

When receiving the block ACK frame, wireless LAN base station 300 inputs to control section 301, a received signal for which the predetermined processing has been performed in radio reception section 109, OFDM demodulation section 110, and decoder section 111. The frame type is then determined in frame type decision section 303. Since a block ACK frame is received here, the frame type information (indicating block ACK) is outputted to transmission control section 305 from frame type decision section 303.

When the frame type information from frame type decision section 303 indicates that the frame is block ACK, transmission control section 305 outputs a transmission command signal to ACK generation section 103. ACK generation section 103 generates a responding ACK frame when receiving the block ACK from station 400, and outputs the ACK frame in accordance with the transmission timing information included in the transmission command signal. The ACK frame is transmitted to station 400 via buffer 105, encoder section 106, OFDM modulation section 107, and radio transmission section 108. The ACK frame is also transmitted in FIG. 9 as a response to the block ACK frame from wireless LAN base station 300 to station 400.

In the description given above, wireless LAN base station 300 transmits a single pilot signal to station 400, and station 400 returns a block ACK to which the reception quality information of the pilot signal has been added to wireless LAN base station 300. However, the present invention is not limited by this configuration, and wireless LAN base station 300 may transmit a plurality of pilot signals. In this case, a configuration may be adopted in which station 400 returns a block ACK having the reception quality information of the most recently transmitted pilot signal added thereto. In short, the reception quality information of the received pilot signal most recent to returning of the block ACK may be fed back to wireless LAN base station 300.

Thus, according to Embodiment 2, the communication system to which the delayed block ACK scheme is applied is provided with: wireless LAN base station 300 having transmission control section 305 that transmits a pilot signal before a block ACK is returned from the reception side in response to a block ACK request; and station 400 having transmission control section 405 that controls the transmission timing of the block ACK; reception quality information generation section 403 that forms reception quality information of the pilot signal; and block ACK generation section 404 that adds the reception quality information to the block ACK.

In this way, it is possible for the wireless LAN base station to receive a block ACK to which the reception quality information on the reception side of the pilot signal transmitted by the base station apparatus, is added. It is therefore possible to obtain feedback information that can be used when transmission data are transmitted using, for example, adaptive modulation and adaptive bit loading (MCS allocation for each subcarrier) in the wireless LAN base station. Thus, it is possible to implement a wireless LAN base station that is capable of performing appropriate data transmission control, thereby performing appropriated at a transmission control in the communication system that is formed from the wireless LAN base station and the station.

In wireless LAN base station 300, transmission control section 305 receives an ACK in response to the block ACK request from station 400 on the reception side and transmits a pilot signal.

By this means, when the block ACK to which the reception quality information obtained from the pilot signal is added, is returned, not much time has elapsed after measurement of the reception quality. Therefore, feedback information can be obtained that can be used when transmission data are transmitted using, for example, adaptive modulation, adaptive bit loading (MCS allocation for each subcarrier) in wireless LAN base station, and the feedback information is useful and accurate due to the fact that not much time has elapsed after measurement. Thus, it is possible to implement a wireless LAN base station that is capable of performing appropriate data transmission control, thereby performing appropriate data transmission control in the communication system that is formed from the wireless LAN base station and the station.

Furthermore, block ACK generation section 404 adds to the block ACK only the reception quality information of the pilot signal received immediately prior to the transmission timing of the block ACK.

By this means, when the block ACK to which the reception quality information obtained from the pilot signal is added, is returned, not much time has elapsed after measurement of the reception quality. Therefore, feedback information can be obtained that can be used when transmission data are transmitted using adaptive modulation, adaptive bit loading (MCS allocation for each subcarrier), and other techniques in wireless LAN base station, and the feedback information is useful and accurate due to the fact that not much time has elapsed after measurement. Thus, it is possible to implement a wireless LAN base station that is capable of performing appropri-ate data transmission control, thereby performing appropriate data transmission control in the communication system that is formed from the wireless LAN base station and the station.

Embodiment 3

Figure 10:
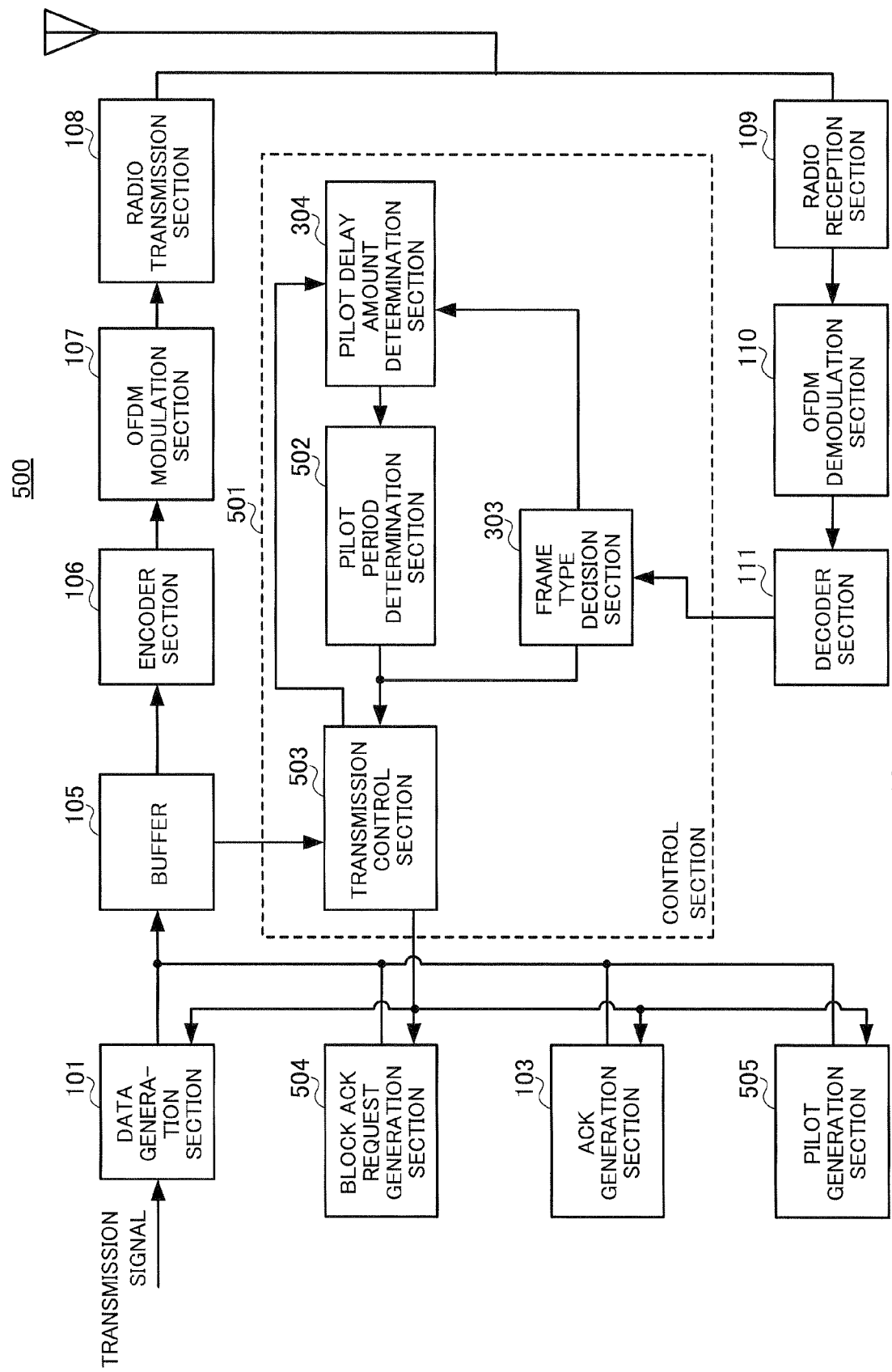
FIG. 10 is a block diagram showing the configuration of the wireless LAN base station according to Embodiment 3.

As shown in FIG. 10, wireless LAN base station 500 of Embodiment 3 has control section 501, block ACK request generation section 504, and pilot generation section 505. Control section 501 has pilot period determination section 502 and transmission control section 503.

Pilot period determination section 502 computes the pilot transmission period from the pilot delay amount outputted from pilot delay amount determination section 304. Specifically, pilot period determination section 502 stores the number of times the pilot signal is transmitted, and computes the pilot transmission period by dividing the pilot delay amount by the number of transmissions of the pilot signal. The computed pilot transmission period information and pilot delay amount are outputted to transmission control section 503. By limiting the number of pilot signal transmissions, it is possible to prevent pilot signal traffic from increasing and to efficiently utilize the medium.

When a transmission completion signal inputted from buffer 105 indicates the completion of transmission of a QoS data frame, transmission control section 503 outputs a pilot period determination command to pilot delay amount determination section 304, and outputs to block ACK request generation section 504, a transmission command signal and the pilot delay amount (used as a reference for determining the time interval until the block ACK frame is returned in station 600) received from pilot delay amount determination section 304 via pilot period determination section 502 in accordance with this command.

When the frame type information from frame type decision section 303 indicates that the frame is an ACK frame, and when pilot period transmission information is received from pilot period determination section 502, transmission control section 503 outputs a transmission command signal (including a transmission command and pilot transmission period information) to pilot generation section 505. When the frame type information from frame type decision section 303 indicates that the frame is a block ACK frame, transmission control section 503 outputs a transmission command signal to ACK generation section 103.

When the transmission completion signal inputted from buffer 105 indicates that transmission of the block ACK request is completed, transmission control section 503 outputs a transmission command signal to pilot generation section 505.

After transmission of the QoS transmission data frame is completed, when the "transmission command signal" and the "pilot delay amount" are inputted from transmission control section 503 of control section 501, block ACK request generation section 504 generates a block ACK request frame, to the header part of which, for example, the same destination address as the QoS transmission data, a frame type that indicates the presence of a block ACK frame, the block ACK type (immediate or delayed) are added. Block ACK request generation section 504 then outputs the block ACK request frame to buffer 105 in accordance with the transmission timing information included in the transmission command signal.

When the transmission command signal is inputted, pilot generation section 505 generates a predetermined pilot signal, and outputs the pilot signal to buffer 105 in accordance with the pilot period information included in the transmission command signal.

Figure 11:
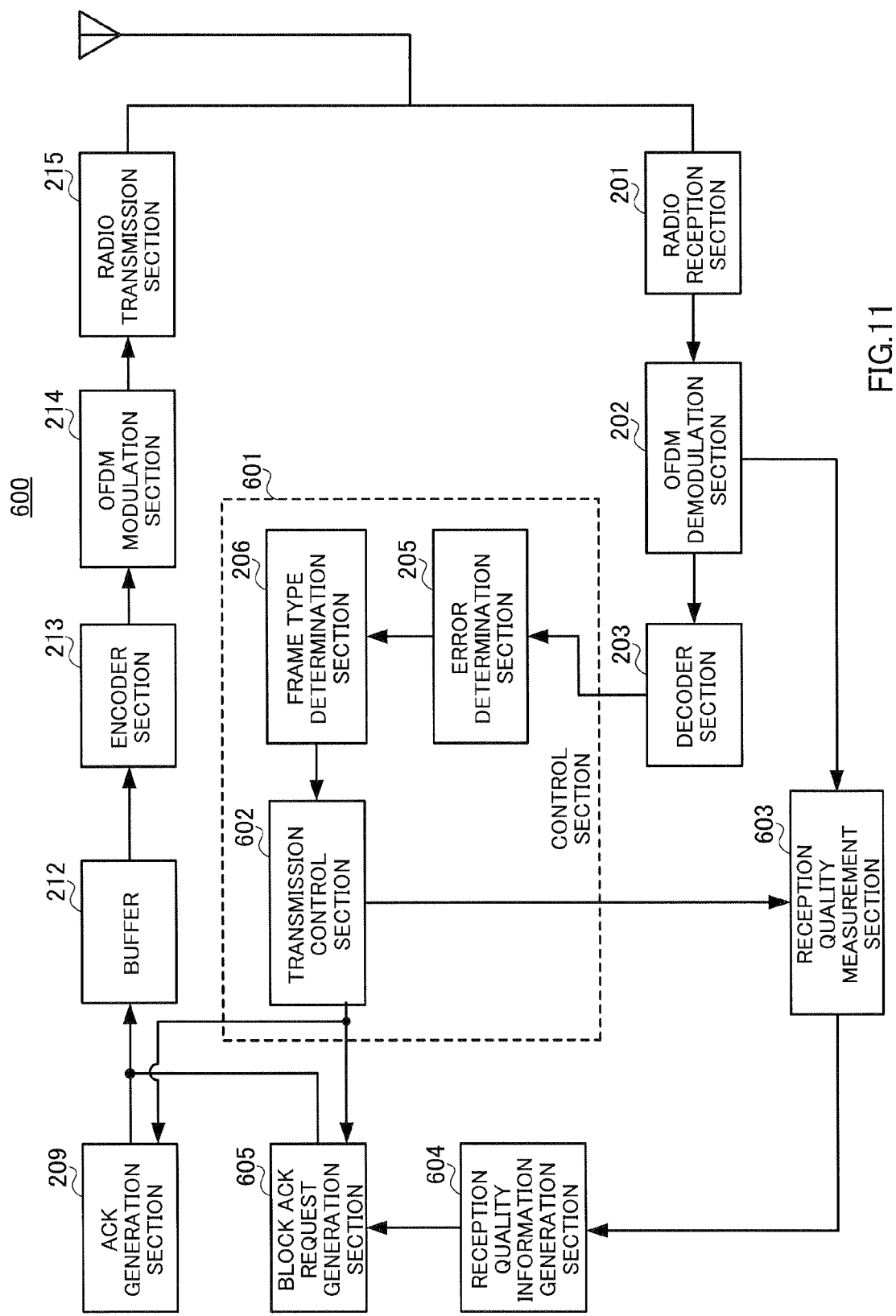
FIG. 11 is a block diagram showing the configuration of the station according to Embodiment 3.

As shown in FIG. 11, station 600 of Embodiment 3 has: control section 601; reception quality measurement section 603; reception quality information generation section 604; and block ACK generation section 605. Control section 601 has transmission control section 602.

Transmission control section 602 receives the data part check result and the frame type results as inputs from frame type determination section 206, and, when the frame type indicates that the frame is QoS data, and when the data part check result is OK/NG, outputs a frame number and an ACK/NACK to block ACK generation section 605.

When the frame type is a block ACK request, and when the data part check result is OK, transmission control section 602 outputs an ACK transmission command to ACK generation section 209. Transmission control section 602 then outputs a block ACK transmission command to reception quality measurement section 603 at time intervals in accordance with the pilot delay amount included in the block ACK request.

When the frame type is a pilot frame, transmission control section 602 outputs a quality measurement command to reception quality measurement section 603.

When receiving the quality measurement command as an input from transmission control section 602, reception quality measurement section 603 refers to the memory of OFDM demodulation section 202 and measures the reception quality (including, for example, SINR) of the subcarrier used for the pilot. Reception quality measurement section 603 also receives the block ACK frame transmission command as an input at the time when the block ACK frame is transmitted, and outputs the reception quality measurement result and the block ACK transmission command to reception quality information generation section 604.

Reception quality information generation section 604 receives the results of measuring the reception quality as an input from reception quality measurement section 603, computes the predetermined reception quality on the basis of the measurement results, and generates reception quality information. The predetermined reception quality is computed by a simple average, a moving average, linear interpolation, or another method. Reception quality information generation section 604 outputs the reception quality information and the block ACK transmission command to block ACK generation section 605.

When receiving the frame number and ACK/NACK as inputs from transmission control section 602, and when receiving the reception quality information and block ACK transmission command (transmission command and transmission timing) as inputs from reception quality information generation section 604, block ACK generation section 605 generates a block ACK frame in a frame format where the frame number, the ACK/NACK, and the reception quality information are included, and outputs the block ACK frame to buffer 212 in accordance with the transmission timing included in the block ACK transmission command.

Next, the operations of the communication system formed from wireless LAN base station 500 and station 600 will be described with reference to FIG. 12. A delayed block ACK scheme is applied to this communication system.

In Embodiment 3, wireless LAN base station 500 transmits a QoS data frame to station 600, and transmits pilot signals for reception quality measurement to station 600 before station 600 returns a block ACK frame in accordance with the pilot transmission period determined by wireless LAN base station 500. Station 600 measures the reception quality from the pilot signals, forms reception quality information on the basis of the measurement results, adds the reception quality information to the block ACK frame, and feeds the result to wireless LAN base station 500.

Wireless LAN base station 500 applies the reception quality information added to the block ACK frame and fed back, to adaptive modulation MCS selection, adaptive bit loading, and other techniques that require feedback information from the reception side.

Figure 12:
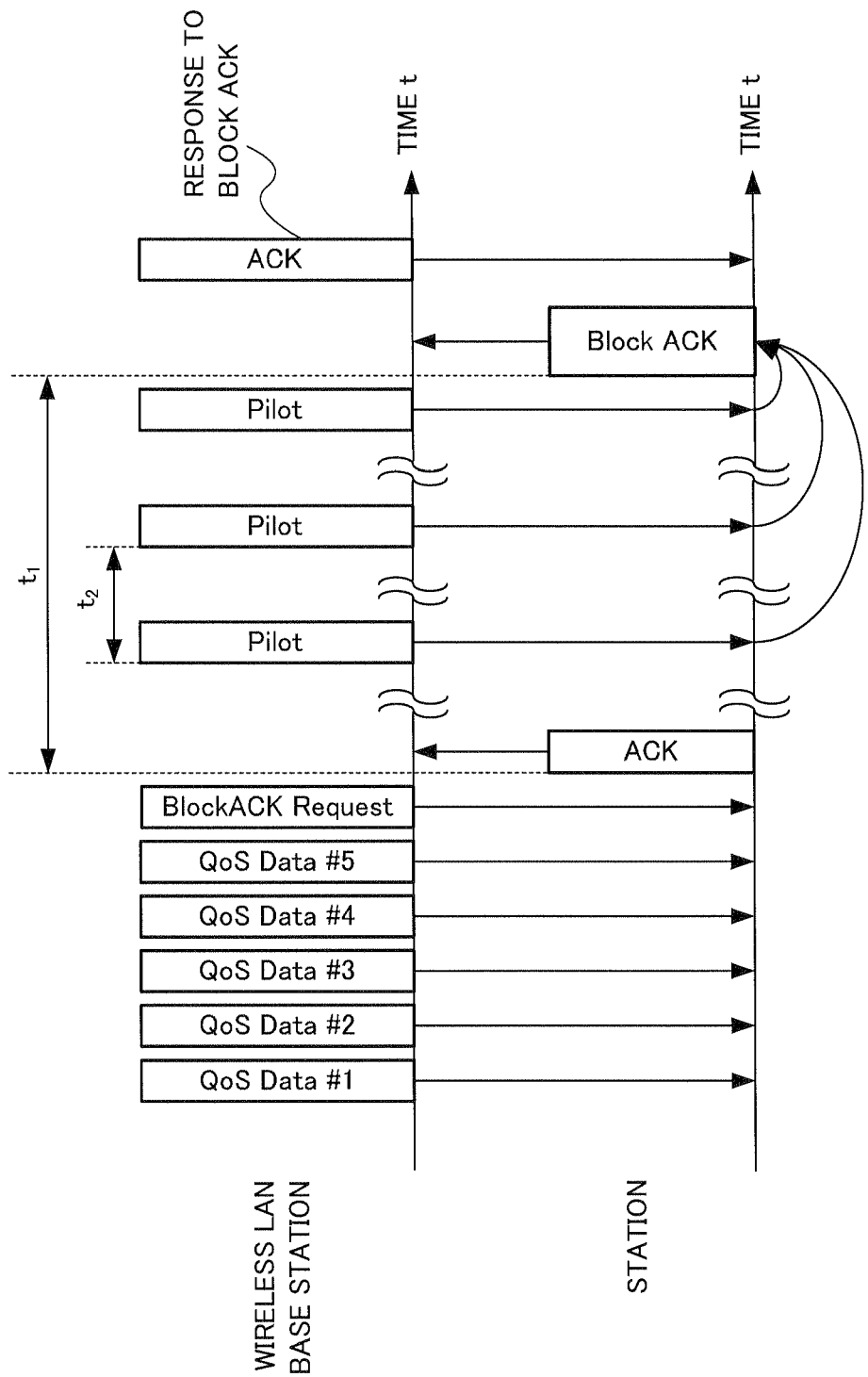
FIG. 12 is a diagram showing the operations of the communication system formed from the wireless LAN base station and station shown in FIG. 10 and FIG. 11, respectively.

Specifically, in wireless LAN base station 500 shown in FIG. 12, the transmission command signal from transmission control section 503 is inputted to data generation section 101, and a transmission frame is outputted in accordance with the transmission timing included in the transmission command signal.

The outputted transmission frame is transmitted to station 600 via buffer 105, encoder section 106, OFDM modulation section 107, and radio transmission section 108. In FIG. 12, QoS data #1 through 5 are transmitted as the transmission frames.

When the transmission completion signal inputted to transmission control section 503 from buffer 105 indicates continuation of QoS data frame transmission, a transmission command signal is outputted to data generation section 101. When the transmission completion signal inputted to transmission control section 503 from buffer 105 indicates completion of QoS data frame transmission, a pilot delay amount determination command is outputted from transmission control unit 503 to pilot delay amount determination section 304, and the pilot delay amount outputted from pilot delay amount determination section 304 in response to this command and inputted to transmission control section 503 via pilot period determination section 502, and a transmission command signal are outputted to block ACK request generation section 504. Block ACK request generation section 504 then generates a block ACK request frame to the header part of which, for example, the same destination address as the QoS transmission frame, a frame type that indicates the presence of a block ACK frame, the block ACK type (immediate or delayed) are added. Block ACK request generation section 504 then outputs the block ACK request frame in accordance with the transmission timing information included in the transmission command signal.

The block ACK request frame is transmitted to station 600 via buffer 105, encoder section 106, OFDM modulation section 107, and radio transmission section 108. The block ACK request frame is also transmitted in FIG. 12 from wireless LAN base station 500 to station 600 after QoS data #5.

When receiving the block ACK request frame, station 600 inputs to control section 601 a received signal for which the predetermined processing has been performed in radio reception section 201, OFDM demodulation section 202, and decoder section 203. Error checking of the header part and the data part is performed in error determination section 205, the frame type is determined in frame type determination section 206, and the data part check results and the determined frame type are inputted to transmission control section 602. Since the block ACK request frame is received here, the frame type inputted to transmission control section 602 is a block ACK request.

In transmission control section 602, when the inputted frame type is indicated as a block ACK request, and when the data part check result is OK/NG, an ACK/NG transmission command is outputted to ACK generation section 209. When the ACK transmission command (transmission command and transmission timing) is inputted from transmission control section 602 to ACK generation section 209, the generated ACK frame is outputted to buffer 212 in accordance with the transmission timing included in the ACK transmission command.

The outputted ACK frame is transmitted to wireless LAN base station 500 via buffer 212, encoder section 213, OFDM modulation section 214, and radio transmission section 215. Station 600 also returns the ACK frame after receiving the block ACK request from wireless LAN base station 500 in FIG. 12.

When receiving the ACK frame, wireless LAN base station 500 inputs to control section 501 a received signal for which the predetermined processing has been performed in radio reception section 109, OFDM demodulation section 110, and decoder section 111. The frame type is determined in frame type decision section 303, and since an ACK frame is received herein, frame type decision section 303 outputs the frame type information to transmission control section 503, and a pilot period determination command to pilot delay amount determination section 304.

When receiving the pilot delay amount determination command as an input from frame type decision section 303, pilot delay amount determination section 304 outputs the pilot delay amount (already determined according to the command from transmission control section 503) to pilot period determination section 502.

Pilot period determination section 502 computes the pilot transmission period from the pilot delay amount outputted from pilot delay amount determination section 304. The computed pilot transmission period information is then outputted to transmission control section 503.

When the frame type information from frame type decision section 303 indicates that the frame is an ACK frame, and when the pilot transmission period information is received from pilot period determination section 502, transmission control section 503 outputs a transmission command signal to pilot generation section 505.

When the transmission command signal is inputted, pilot generation section 505 generates a predetermined pilot signal, and outputs the pilot signal in accordance with the pilot transmission period information. The pilot signal is transmitted to station 600 via buffer 105, encoder section 106, OFDM modulation section 107, and radio transmission section 108 in the transmission period in accordance with the pilot period information. The pilot signal is also transmitted to station 600 in the predetermined signal period in FIG. 12. The time interval t1 shown in the drawing corresponds to the abovementioned pilot delay time, and t2 corresponds to the pilot transmission period indicated by the pilot transmission period information.

When receiving the pilot signal, station 600 inputs to control section 601 a received signal for which the predetermined processing has been performed in radio reception section 201, OFDM demodulation section 202, and decoder section 203. Error check of the header part and the data part is performed in error determination section 205, the frame type is determined in frame type determination section 206, and the data part error check results and the determined frame type are inputted to transmission control section 602. Since the pilot signal is received here, the frame type inputted to transmission control section 602 is a pilot.

When the inputted frame type is a pilot frame, transmission control section 602 outputs a quality measurement command to reception quality measurement section 603.

When the quality measurement command is inputted from transmission control section 602, reception quality measurement section 603 refers to the memory of OFDM demodulation section 202 and measures the reception quality (including, for example, SINR) of the subcarrier used for the pilot.

Transmission control section 602 outputs a block ACK transmission command to reception quality measurement section 603 at time intervals in accordance with the pilot delay amount included in the block ACK request.

At the time the block ACK frame is transmitted, reception quality measurement section 603 receives the block ACK transmission command as an input and outputs the measurement results and the block ACK transmission command to reception quality information generation section 604.

Reception quality information generation section 604 receives the results of measuring the reception quality as an input from reception quality measurement section 603, computes the predetermined reception quality on the basis of the measurement results, and generates reception quality information. Reception quality information generation section 604 outputs the reception quality information and the block ACK transmission command to block ACK generation section 605.

When receiving the frame number and ACK from transmission control section 602 as inputs, and the reception quality information and block ACK transmission command (transmission command and transmission timing) as inputs from reception quality information generation section 604, block ACK generation section 605 generates a block ACK frame in a frame format such as one having the frame number, the ACK/NACK, and the reception quality information, and outputs the block ACK frame in accordance with the transmission timing included in the block ACK transmission command.

The block ACK frame outputted from block ACK generation section 605 is transmitted to wireless LAN base station 500 via buffer 212, encoder section 213, OFDM modulation section 214, and radio transmission section 215. The block ACK frame is also transmitted from station 600 to wireless LAN base station 500 in FIG. 12.

When receiving the block ACK frame, wireless LAN base station 500 inputs to control section 501 a received signal for which the predetermined processing has been performed in radio receiving section 109, OFDM demodulation section 110, and decoder section 111. The frame type is determined in frame type decision section 303. Since a block ACK frame is received herein, the frame type information (indicating block ACK) is outputted to transmission control section 503 from frame type decision section 303.

When the frame type information from frame type decision section 303 indicates that the frame is block ACK, transmission control section 503 outputs a transmission command signal to ACK generation section 103. ACK generation section 103 generates a responding ACK frame when the block ACK is received from station 600, and outputs the ACK frame in accordance with the transmission timing information included in the transmission command signal. The ACK frame is transmitted to station 600 via buffer 105, encoder section 106, OFDM modulation section 107, and radio transmission section 108. The ACK frame is also transmitted from wireless LAN base station 500 to station 600 as a response to the block ACK frame in FIG. 12.

In this way, according to Embodiment 3, wireless LAN base station 500 is provided with: transmission control section 503 that transmits a block ACK request; pilot generation section 505 that generates a pilot signal for measuring reception quality; and transmission control section 503 that transmits the pilot signal before a block ACK to which the computed reception quality information has been added is returned from a reception side in response to a block ACK request.

Furthermore, wireless LAN base station 500 is provided with: transmission control section 503 that transmits the pilot delay amount as transmission timing specification information of the block ACK; and pilot period determination section 502 that determines the transmission period of the pilot signal according to the transmission timing specification information. Transmission control section 503 transmits the pilot signal according to the transmission period.

In this way, it is possible to receive a block ACK to which the reception quality information on the reception side of the pilot signal transmitted by the communication apparatus, is added. It is therefore possible to obtain feedback information that can be used when transmission data are transmitted using, for example, adaptive modulation and adaptive bit loading (MCS allocation for each subcarrier) in wireless LAN base station 500. A wireless LAN base station can thus be provided that is capable of performing appropriate data transmission control. Further, it is possible to implement a wireless LAN base station that is capable of performing more appropriate data transmission control and enhancing the reliability of reception quality information by performing, for example, linear interpolation of the reception quality of the plurality of periodically transmitted pilot signals on the reception side.

In wireless LAN base station 500, transmission control section 503 receives an ACK in response to the block ACK request from station 600 on the reception side and transmits a pilot signal.

By this means, when the block ACK to which the reception quality information obtained from the pilot signal is added, is returned, not much time has elapsed after measurement of the reception quality. Therefore, feedback information can be obtained that can be used when transmission data are transmitted using adaptive modulation, Adaptive bit loading (MCS allocation for each subcarrier), and other techniques in wireless LAN base station 500, and the feedback information is useful and accurate due to the fact that not much time has elapsed after measurement. It is possible to implement a wireless LAN base station that is capable of performing appropriate data transmission control in accordance with accurate feedback information.

According to Embodiment 3, station 600 is provided with: transmission control section 602 that controls the timing at which the block ACK is transmitted in response to the block ACK request; reception quality information generation section 604 that forms reception quality information of the pilot signal; and block ACK generation section 605 that adds the reception quality information to the block ACK.

Reception quality information generation section 604 receives pilot signals periodically transferred from wireless LAN base station 500, and forms reception quality information using the reception quality of the pilot signals.

In this way, the reception quality information of the pilot signal is added to the block ACK, and the block ACK is transmitted, so that it is possible to provide to the reception side, feedback information used for, for example, adaptive modulation and adaptive bit loading (MCS allocation for each subcarrier) of the transmission data. Thus, it is possible to implement a station that is capable of contributing to appropriate data transmission control on the reception side of the feedback information, and enhancing the reliability of reception quality information by, for example, performing linear interpolation of the reception quality of the plurality of periodically transmitted pilot signals.

Thus according to Embodiment 3, it is possible to provide a communication apparatus that is capable of appropriate data transmission control, and a communication system that is configured with the communication apparatus.

In a first aspect of the communication system of the present invention, a communication system is provided that adopts a delayed block ACK scheme and a configuration having: a wireless LAN base station having: a pilot transmission section that transmits a pilot signal before a block ACK is returned from a reception side in response to a block ACK request; and a station having: a transmission control section that controls a transmission timing of the block ACK; a reception quality measurement section that measures reception quality from the pilot signal; a reception quality information generation section that forms reception quality information on the basis of the reception quality; and a block ACK generation section that adds the reception quality information to the block ACK.

According to this configuration, it is possible for the wireless LAN base station to receive a block ACK to which the reception quality information on the reception side of the pilot signal transmitted by the base station apparatus, is added. It is therefore possible to obtain feedback information that can be used when transmission data are transmitted using, for example, adaptive modulation and adaptive bit loading (MCS allocation for each subcarrier) in the wireless LAN base station. Thus, it is possible to implement a wireless LAN base station that is capable of performing appropriate data transmission control, thereby performing appropriate data transmission control in the communication system that is formed from the wireless LAN base station and the station.

In a second aspect of the communication system of the present invention, the wireless LAN base station transmits the pilot signal according to a predetermined transmission period, and the station receives a plurality of pilot signals and forms the reception quality information using a reception quality of the pilot signals.

By this configuration, it is possible to implement a wireless LAN base station that is capable of performing more appropriate data transmission control and enhancing the reliability of reception quality information by performing, for example, linear interpolation of the reception quality of the plurality of periodically transmitted pilot signals in the station on the reception side.

In a third aspect of the communication system of the present invention, the block ACK generation section adds to the block ACK only reception quality information of the pilot signal received immediately prior to a transmission timing of the block ACK.

According to this configuration, when the block ACK to which the reception quality information obtained from the pilot signal is added, is returned, not much time has elapsed after measurement of the reception quality. Therefore, feedback information can be obtained that can be used when transmission data are transmitted using adaptive modulation, adaptive bit loading (MCS allocation for each subcarrier), and other techniques in the wireless LAN base station, and the feedback information is useful and accurate due to the fact that not much time has elapsed after measurement. Thus, it is possible to implement a wireless LAN base station that is capable of performing appropriate data transmission control, thereby performing appropriate data transmission control in the communication system that is formed from the wireless LAN base station and the station.

In a fourth aspect of the communication system of the present invention, the wireless LAN base station having: a transmission timing specification information transmission section that transmits transmission timing specification information of the block ACK; and a pilot transmission period determining section that determines a transmission period of the pilot signal according to the transmission timing specification information; wherein the station receives a plurality of pilot signals, forms the reception quality information using a reception quality of the pilot signals, and transmits the block ACK having the reception quality information added thereto according to the transmission timing specification information.

According to this configuration, it is possible for the wireless LAN base station to receive a block ACK to which the reception quality information on the reception side of the pilot signal transmitted by the base station apparatus, is added. It is therefore possible to obtain feedback information that can be used when transmission data are transmitted using, for example, adaptive modulation and adaptive bit loading (MCS allocation for each subcarrier) in the wireless LAN base station. A wireless LAN base station can be implemented that is capable of performing appropriate data transmission control. It is also possible to provide a wireless LAN base station that is capable of performing more appropriate data transmission control and enhancing the reliability of reception quality information by performing, for example, linear interpolation of the reception quality of the plurality of periodically transmitted pilot signals in the reception side (station) thereby performing appropriate data transmission control in the communication system that is configured with the wireless LAN base station and the station.

The first aspect of the communication apparatus of the present invention has: a transmission section that transmits a block ACK request; a pilot generation section that generates a pilot signal for measuring reception quality; and a pilot transmission section that transmits the pilot signal before a block ACK to which reception quality information of the pilot signal is added is returned from a reception side in response to the block ACK request.

According to this configuration, it is possible to receive a block ACK to which the reception quality information on the reception side of the pilot signal transmitted by an apparatus, is added. It is therefore possible to obtain feedback information that can be used when transmission data are transmitted using, for example, adaptive modulation and adaptive bit loading (MCS allocation for each subcarrier) in the apparatus. A communication apparatus can thus be provided that is capable of performing appropriate data transmission control, and appropriate data transmission control can also be performed in the communication system that is composed of the communication apparatus.

The second aspect of the communication apparatus of the present invention comprises a transmission timing specification information transmission section that transmits transmission timing specification information of the block ACK; and a pilot transmission period determination section that determines a transmission period of the pilot signal according to the transmission timing specification information; wherein the pilot transmission section transmits the pilot signal in accordance with the transmission period.

The communication apparatus can thereby acquire a block ACK to which is added the reception quality information on the reception side of the pilot signal transmitted by the communication apparatus. It is therefore possible to obtain feedback information that can be used when transmission data are transmitted using adaptive modulation, Adaptive bit loading (MCS allocation for each subcarrier), and other techniques in the communication apparatus. A wireless LAN base station can thus be provided that is capable of performing appropriate data transmission control. Further, it is possible to implement a wireless LAN base station that is capable of performing more appropriate data transmission control and enhancing the reliability of reception quality information by performing, for example, linear interpolation of the reception quality of the plurality of periodically transmitted pilot signals on the reception side.

A first aspect of another communication apparatus of the present invention adopts a configuration having: a transmission control section that controls a transmission timing of a block ACK in response to a block ACK request; a reception quality information generation section that forms reception quality information of a pilot signal; and a block ACK generation section that adds the reception quality information to the block ACK.

According to this configuration, the reception quality information of the pilot signal is added to the block ACK, and the block ACK is transmitted, so that it is possible to provide feedback information used for, for example, adaptive modulation and adaptive bit loading (MCS allocation for each subcarrier) of the transmission data transmitted to the reception side. A communication apparatus can thus be provided that is capable of contributing to appropriate data transmission control on the reception side of the feedback information.

The present application is based on Japanese Patent Application No. 2004-333639, filed on Nov. 17, 2004, the entire content of which is expressly incorporated by reference herein.

INDUSTRIAL APPLICABILITY

The communication system and communication apparatus of the present invention have an advantage of performing appropriate data transmission control, and are useful as a communication system to which a delayed block ACK scheme is applied, and as a wireless LAN base station and station that constitute the communication system.

The invention claimed is:

1. A communication system comprising:
a wireless LAN base station comprising a pilot transmission section that transmits a block ACK request after having transmitted a series of data, and transmits a pilot signal after an ACK signal is received from a reception side in response to the block ACK request, before a block ACK is returned from the reception side; and
a station comprising:
a transmission control section that controls a transmission timing of the block ACK;
a reception quality measurement section that measures reception quality from the pilot signal;
a reception quality information generation section that forms reception quality information on the basis of the reception quality; and
a block ACK generation section that adds the reception quality information to the block ACK.

2. The communication system according to claim 1, wherein the wireless LAN base station transmits the pilot signal according to a predetermined transmission period, and the station receives a plurality of pilot signals and forms the reception quality information using a reception quality of the pilot signals.

3. The communication system according to claim 1, wherein the block ACK generation section adds to the block ACK only reception quality information of the pilot signal received immediately prior to a transmission timing of the block ACK.

4. The communication system according to claim 1, wherein:

the wireless LAN base station comprises:

a transmission timing specification information transmission section that transmits transmission timing specification information of the block ACK; and a pilot transmission period determining section that determines a transmission period of the pilot signal according to the transmission timing specification information; and the station receives a plurality of pilot signals, forms the reception quality information using a reception quality of the pilot signals, and transmits the block ACK having the reception quality information added thereto according to the transmission timing specification information.

5. A communication apparatus comprising:

a transmission section that transmits a block ACK request after having transmitted a series of data;

a pilot generation section that generates a pilot signal for measuring reception quality; and a pilot transmission section that transmits the pilot signal after an ACK signal is received from a reception side in response to the block ACK request, before a block ACK having reception quality information of the pilot signal added thereto is returned from the reception side in response to the block ACK request.

6. The communication apparatus according to claim 5, comprising:

a transmission timing specification information transmission section that transmits transmission timing specification information of the block ACK; and a pilot transmission period determination section that determines a transmission period of the pilot signal according to the transmission timing specification information, wherein the pilot transmission section transmits the pilot signal in accordance with the transmission period.

7. A communication apparatus comprising:

a reception section that, after having received a series of data transmitted from a transmission side, receives a block ACK request transmitted from the transmission side, and receives a pilot signal transmitted from the transmission side after the block ACK request;

a transmission control section that controls a timing at which a block ACK is transmitted in response to the block ACK request;

a reception quality information generation section that forms reception quality information of the pilot signal; and a block ACK generation section that adds the reception quality information to the block ACK.

* * * * *